US009332390B1

(12) United States Patent
Bietz et al.

(10) Patent No.: US 9,332,390 B1
(45) Date of Patent: May 3, 2016

(54) MOBILE DEVICE UTILIZING TIME OF FLIGHT FOR PERSONAL SECURITY AND LOCALIZATION

(71) Applicants: Steven Lee Bietz, Cypress, TX (US); Jesus Acosta-Cazaubon, Rochester, NY (US)

(72) Inventors: Steven Lee Bietz, Cypress, TX (US); Jesus Acosta-Cazaubon, Rochester, NY (US)

(73) Assignee: Voll, Inc., Cypress, TX (US)

( * ) Notice: Subject to any disclaimer, the term of this patent is extended or adjusted under 35 U.S.C. 154(b) by 0 days.

(21) Appl. No.: 14/997,559

(22) Filed: Jan. 17, 2016

Related U.S. Application Data

(62) Division of application No. 14/484,933, filed on Sep. 12, 2014, now Pat. No. 9,270,319.

(51) Int. Cl.
*H04W 4/02* (2009.01)
*H04W 56/00* (2009.01)

(52) U.S. Cl.
CPC .......... *H04W 4/023* (2013.01); *H04W 56/0025* (2013.01)

(58) Field of Classification Search
CPC ....... H04W 4/008; H04W 64/00; H04W 4/02; H04W 29/08657; H04W 4/023; H04W 56/0025; H04B 1/3888; H04B 1/3877; G01S 5/0252; G01S 5/02
See application file for complete search history.

(56) References Cited

U.S. PATENT DOCUMENTS

| | | | |
|---|---|---|---|
| 2008/0170559 A1* | 7/2008 | Zumsteg | G01S 7/003 370/350 |
| 2011/0195753 A1 | 8/2011 | Mock et al. | |
| 2013/0033358 A1 | 2/2013 | Yamazaki et al. | |
| 2013/0146661 A1 | 6/2013 | Melbrod et al. | |
| 2014/0266907 A1* | 9/2014 | Taylor, Jr. | G01S 5/10 342/387 |

* cited by examiner

*Primary Examiner* — Ted Wang
(74) *Attorney, Agent, or Firm* — Tracy Jong Law Firm; Tracy P. Jong; Cheng Ning Jong

(57) ABSTRACT

A mobile device case for functional connection and physical attachment to a mobile device, the mobile device case comprises an application adapted to run in the mobile device and a cradle configured for removable attachment with the mobile device, the cradle comprising a controller capable of functional connection with the application, where the cradle is adapted to protect the mobile device while attached to the mobile device and the cradle is adapted to functionally pair with the application to create at least a portion of a mesh network.

4 Claims, 11 Drawing Sheets

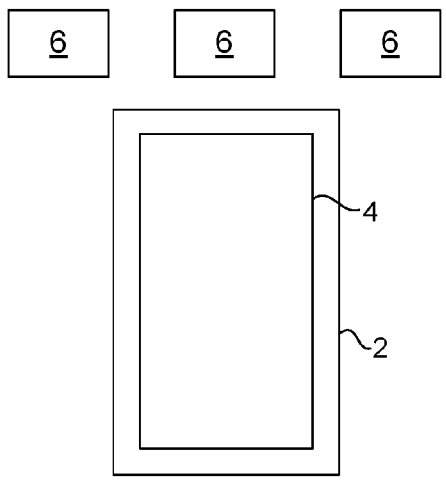
FIG. 1
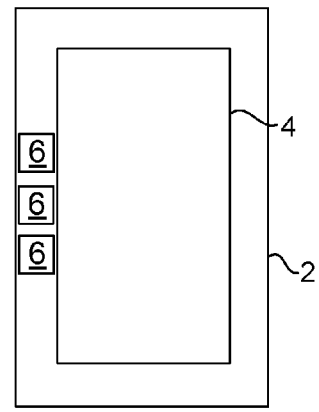
FIG. 2
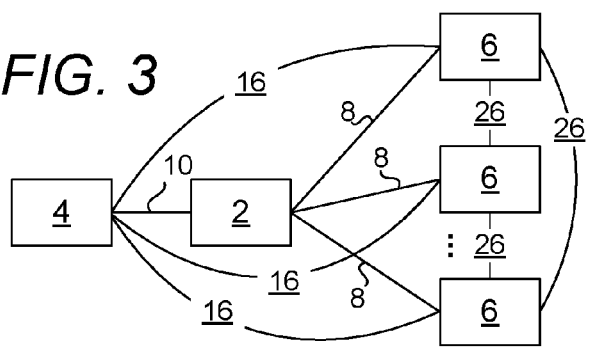
FIG. 3
FIG. 4
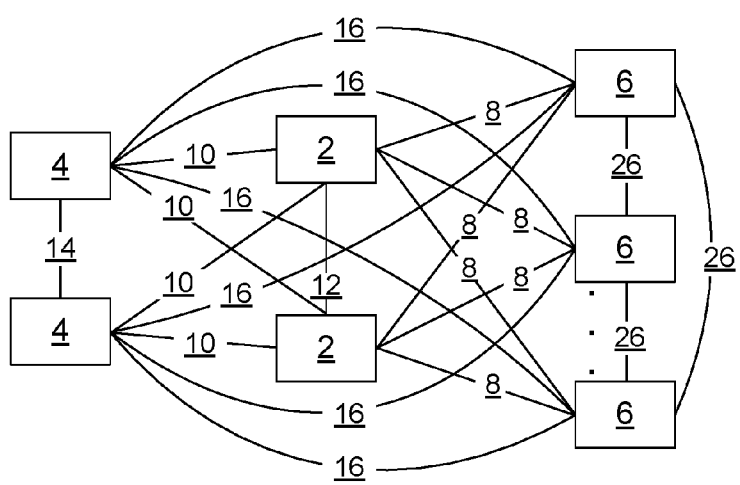
FIG. 5

MOBILE DEVICE UTILIZING TIME OF FLIGHT FOR PERSONAL SECURITY AND LOCALIZATION

PRIORITY CLAIM AND RELATED APPLICATIONS

This divisional application claims the benefit of priority from non-provisional application U.S. Ser. No. 14/484,933 filed on Sep. 12, 2014 and provisional application U.S. Ser. No. 61/877,935 filed on Sep. 13, 2013. Said application is incorporated by reference in its entirety.

BACKGROUND OF THE INVENTION

1. The Field of the Invention

The present invention is directed generally to a system for enabling personal security and localization. More specifically, the present invention is directed to a system for enabling personal security that is coupled to a ubiquitous mobile device and a localization system not dependent on a Global Positioning System (GPS) network.

2. Background Art

Low cost mobile personal security monitoring devices have been typically limited to discrete devices that require additional package space for travel. These devices are often limited to simply performing the action of an audio or visual alarm if an event such as the opening of a hotel room door is detected. These monitoring devices also have typically required that human action be taken to call for help. These low cost devices have typically not made use of automated communication through network means to notify various parties for help based on preprogrammed parameters and Global Positioning System (GPS) coordinates. Such low cost personal security devices have not integrated multiple detection methods and aggregated monitoring sensors and devices, located both local and distant, into a convenient and small travel package. Further, they have not included the ability to aggregate additional monitoring devices and to form mesh networks of multiple personal security devices and peripherals through communication means, such as Near Field Communication (NFC), Bluetooth, Wi-Fi and other wireless communication means. They also were not able to aggregate distant monitoring devices through wireless communication to the internet and wireless communication to other devices from the internet to remote aggregated devices. Disclosed below are references in which one or more elements of the present invention may be disclosed but none of which disclose devices used for performing the functions of the present invention.

U.S. Pat. Pub. No. 20130033358 of Yamazaki et al. (hereinafter Yamazaki) discloses a system including at least one sender, and a beacon signal sent from the sender that is received by a portable terminal. In accordance with a sender ID included in the beacon signal, the portable terminal displays on an Liquid Crystal Display (LCD) a map image and a current position of the portable terminal or a user having the portable terminal, and displays on the LCD a guide image as for events or exhibition items in a predetermined place. The portable terminal stores state information included in the beacon signal for each sender (sender ID), and transmits or moves the state information to a central terminal at a predetermined timing. Yamazaki fails to disclose a case capable of physical coupling to a mobile device. Yamazaki further fails to disclose a means by which to detect a large motion or movement and guard against detecting vibrations which are to be ignored. This publication fails to include a mesh network in that senders/nodes do not relay information between each other but only to a portable terminal. Further, the portable terminals do not relay information between each other and are not able to relay information from one terminal to another and back to the central terminal. A mobile terminal is unable to communicate directly to the central terminal. Thus, if a portable terminal loses communication, it cannot relay through another portable terminal. Note also in this disclosure that vibration is used to detect that a sender or node has been moved from a stationary position. A notice of vibration or movement indicates that repositioning and recalibration of Yamazaki's portable terminal is required while the present invention includes senders or nodes that can be continuously moving (as not required to be stationary). Yamazaki fails to disclose localization methods.

U.S. Pat. Pub. No. 20130146661 of Melbrod et al. (hereinafter Melbrod) discloses embodiments of a smart phone casing and information exchange system which enables a user to carry a single system that merges the digital and telecommunications necessities of the individual with the personalized cards, membership accounts, consumer credit and/or medical insurance or health information in a single source protected both physically with a hardened case, and digitally with appropriate safeguards for electronic protection. Melbrod demonstrates the use of a smart phone case capable of storing information and safeguards for allowing certain information exchanges only. It does not however disclose a smart phone case having the tools and means for detecting large motions and movements, etc. Melbrod also fails to disclose localization methods.

U.S. Pat. Pub. No. 20110195753 of Mock et al. (hereinafter Mock) discloses a smart phone case with Light Emitting Diodes (LEDS). In a particular embodiment, the case includes a front portion adapted to cradle a lower portion of a smart phone, a rear portion adapted to engagingly mate with the front portion to secure the smart phone within the case, a first strip of LEDS and a second strip of LEDS that are mounted on opposing sides of the front portion, a vibrating sensor that is adapted to activate the LEDS of the case when a vibrator of the smart phone is vibrating, and circuitry is used to control the vibrating sensor and the LEDS. The vibrating sensor detects vibrations of the vibrator of the smart phone when the smart phone is receiving an incoming call or message. The LEDS are programmed to display in a set sequence when activated, where the set sequence to display the LEDS is selected by a user. Mock demonstrates the use of a case for detecting vibration from a smart phone and taking an action, i.e., activating LEDS based on the detection of the vibration. It does not however disclose a smart phone case having the tools and means for detecting large motion and movements, etc. Mock also fails to disclose localization methods.

Therefore, there arises a need for a mobile personal security system which can be seamlessly coupled with a ubiquitous mobile device for providing personal security and a localization system not dependent on a Global Positioning System (GPS) network at low costs.

SUMMARY OF THE INVENTION

A mobile device case for functional connection and physical attachment to a mobile device, the mobile device case includes:
  (a) an application adapted to run in the mobile device; and
  (b) a cradle configured for removable attachment with the mobile device, the cradle including a controller capable of function connection with the application, wherein the cradle is adapted to protect the mobile device while attached to the mobile device and the cradle is adapted to functionally pair with the application to create at least a portion of a mesh network.

In one embodiment, the present system further includes at least one sensor.

In one embodiment, the at least one sensor is an accelerometer.

In one embodiment, the at least one sensor is a directional antennae.

In one embodiment, the present system further includes at least one socket for receiving at least one sensor.

In one embodiment, the functional connection is wired. In another embodiment, the functional connection is wireless.

In one embodiment, the present system further includes a transmitter and a receiver.

In one embodiment, the functional connection is made according to Bluetooth. In another embodiment, the functional connection is made according to wireless local area network (Wi-Fi).

In one embodiment, the functional connection includes:
(a) communicating a message from the mobile device case to the application;
(b) calculating a time of flight of the message; and
(c) comparing the time of flight to an expected time of flight to yield a discrepancy,
wherein if the discrepancy is greater than a predetermined value, an action is initiated by one of the application and the mobile device case.

In one embodiment, the functional connection includes:
(a) communicating a message from the application to the mobile device case;
(b) calculating a time of flight of the message; and
(c) comparing the time of flight to an expected time of flight to yield a discrepancy,
wherein if the discrepancy is greater than a predetermined value, an action is initiated by one of the application and the mobile device case.

In one embodiment, there is provided a method for determining the location of a frequency receiver device from a frequency originator device of a known location. The method comprises:
(a) synchronizing a clock of the frequency originator device with a clock of the frequency receiver device;
(b) receiving by the frequency receiver device a directional message containing a broadcast time at which the directional message is broadcasted at an orientation from the frequency originator device;
(c) calculating a time of flight of the directional message by calculating the difference between a receive time at which the directional message is received by the frequency receiver device and the broadcast time and determining the distance between the frequency originator device and the frequency receiver device by multiplying the time of flight of the directional message by the speed of the directional message;
(d) determining the frequency of the directional message and determining the orientation by looking up a table containing orientations of messages about the frequency originator device with respect to the frequency of the messages; and
(e) determining the location of the frequency receiver device based on the orientation and the known location of the frequency originator device.

In one embodiment, the frequency originator device comprises a long range acoustic device (LRAD). In another embodiment, the frequency originator device comprises a phased array speaker system.

In one embodiment, at least one of the frequency receiver device and the frequency originator device is a mobile device.

There is further provided a method for determining the location of a frequency receiver device with respect to at least two frequency originator devices, each of a known location. The method comprises:
(a) synchronizing a clock of the frequency receiver device with a clock of one of the at least two frequency originator devices;
(b) receiving by the frequency receiver device, a message containing a broadcast time at which the message is broadcasted from the one of the at least two frequency originator devices;
(c) calculating a time of flight of the message by calculating the difference between a receive time at which the message is received by the frequency receiver device and the broadcast time;
(d) repeating steps (a)-(c) for another one of the at least two frequency receiver devices to result in a first time of flight and a second time of flight;
(e) calculating a ratio of the first time of flight and the second time of flight;
(f) resolving possible locations of the frequency receiver device by looking up a table containing possible locations of the frequency receiver device with respect to the locations of the at least two frequency originator devices; and
(g) applying at least one limit to the possible locations to select one of the possible locations with high certainty.

In one embodiment, at least one of the frequency receiver device and the at least two frequency originator devices is a mobile device.

In one embodiment, the frequency receiver device and the frequency originator device are capable of underwater operation.

In one embodiment, the known location is not fixed in place but movable.

In one embodiment, the synchronizing step is performed via a peer-to-peer arrangement. In another embodiment, the synchronizing step is performed via a web server arrangement.

In one embodiment, there is provided a mobile device case that itself can serve as a sensor module that can be removed from the phone and placed for security monitoring (e.g., it can be removed from the phone and with an attached lanyard hung from a room door to detect motion with an integrated accelerometer).

One embodiment of the present invention includes a mobile device case or mobile personal security device (MPSD) constructed so as to function as a mobile device case for devices such as mobile phones, tablets, and other mobile communication devices and peripheral devices thereof and the like. An MPSD may include one or more assembly modules and monitoring capabilities for use in conjunction with a mobile device or mobile communication device (MCD) such as a mobile phone, computer tablet and the like. The MPSD is constructed so as to be able to optionally include one or more sensors or Secure Linked Devices (SLD) that can be decoupled from wired and wireless connections to the MPSD and provide monitoring through a plurality of methods for sensor and other data input into the MPSD. This MPSD device may include, but not limited to, an MCD case having one or more integrated sensors such as an accelerometer and an attachment method such as a lanyard for attaching to a door handle or other object for the purpose of security monitoring. A mobile device case that is removable, functions not only as a proxy or data concentrator to external sensors, but also provides an optimized method of carrying or attaching those sensors for ease and simplicity of transport to a new location. In one embodiment, the present sensors can be attached to or detached by sliding into slots in the case or sliding off from the slots.

This system also functions as a mesh network allowing sensors to relay data to the mobile device or to the "smart case" with the smart case functioning as a proxy and data concentrator. Further, more than one mobile device can be securely paired to the system allowing multiple persons to receive and act upon the data (i.e., two parents, each monitoring children with sensor modules). Note that sensors in a mesh network can form subgroups to allow for, but not limited to, (a) data averaging; (b) focused monitoring such as extra listening sensors attached to a baby's crib to listen for breathing/movement from multiple directions (as a baby may be facing different directions). In one embodiment, this mesh network system is fully mobile and easily moved and set-up at a new location (e.g., a hotel room) as all components including MCDs are mobile.

In one embodiment, the present security system makes use of remote sensors to detect motion, relative distance, and direction of motion through the combination of synchronized clocks, an accelerometer, time of flight between devices and a mobile device (or smart case working as a proxy/data concentrator).

The present security system may not provide accurate location information but such information is suitable for a monitoring system that would provide these parameters for use in keeping a group of kids together, e.g., via sensors attached to each kid in a public venue. Often, in such applications, accurate distance measurements are unnecessary. In some embodiments, compass readings may be utilized to assist in making directional references for the system.

Practical application examples include, but not limited to the following:

(a) A sensor with a Radio Frequency (RF) receiver (Wi-Fi for example), an accelerometer, and its clock synchronized to a system (all devices in the system being synchronized when set-up at a new location) is attached to a door. The accelerometer detects motion and sends an initial alarm signal. The MPSD and/or MCD determines if the motion indicates low or high risk and takes actions based on the interpretation of the data (i.e., an extreme event indicating the door has likely been kicked-in or a small vibration likely due to air movement). As the initial motion has been detected, the second part of the security monitoring comes into play; the detection of relative motion, speed, and change in position of the sensor in order to determine if a security risk exists. This detection is made by comparing the time lapsed between sent and received signals between the MPSD and MCD to determine if there is a security risk. In the example above, only one accelerometer is used. This can lead to false interpretation of small vibrations of the door as low risk and likely just air movement. However, the small vibrations can be the result of an actual tampering of the door lock and slow opening of the door so as not to trigger a security risk assessment. In order to know more precisely if the door has been opened, there is a need for detecting a change in position of the sensor. This is accomplished by determining the time of flight of the signals between the MPSD on the door and the MCD. In this way, a door being tampered with (e.g., lock picked) and opened could be accurately identified and an alarm created. In another embodiment, comparisons of time stamps between the senders and receivers are used to indicate situations of concern.

(b) In a second example, a group of persons are monitored and kept together. For instance, a group of preteens on a field trip are monitored and kept together with two or more teachers. Each preteen can be in possession of a sensor module handed to them by a teacher. The teachers, each having a mobile device linked as part of the mesh network could monitor the relative distance (near, moderate, far), relative rate of travel (relative, not needing a unit reference, and low accuracy but as compared to others in the group), and relative direction of travel (again relative to the need with general direction and low level of accuracy needed).

(c) In a third example, the system could be set-up by placing sensors at stationary locations around a given vacant area where changes in the RF signal characteristics are monitored. Such changes could indicate changes in the time of flight of signals between devices and the possible presence of an intruder. The present system may seek new signals from devices that are not part of the security system indicating the presence of a new signal source that could be an intruder (e.g., a burglar with a cell phone or a remote control device and its new signal being identified as new to the monitored area). This is especially useful in that motion detection by tracking a heat source across zones, e.g., in a traditional security motion sensing situation, would not be necessary and temperature variations (e.g., due to forced air heating sources) in the air would not be a significant factor. Further, movement of non living objects would also be detected preventing remote control devices in possession of intruders from not being detected.

In one embodiment, an MPSD is constructed as a discrete device that can be worn on the body in the form of a MCD case that is worn similarly to a watch in that it attaches to a body limb or other body part and may be decoupled from the MCD providing remote monitoring through a plurality of wireless and wired communications. The MPSD can be coupled to a Brain-computer interface (BCI) and/or wired glove/data-glove/cyberglove" (connected or not to exosuit/Virtual Reality (VR) glasses/perception extension devices) to improve or help human capabilities.

In one embodiment, an MPSD functionality is integrated into a wristband (watch)/multiple body bands type (bodysuit) device/devices having a plurality of purposes such as, but not limited to, time monitoring, Global Positioning System (GPS) location, heart/oxygen/humidity/sugar levels/allergy monitoring worn through attachment to a body limb or other body part where this body device and body device extensions allow better conditions for human performance. This capability can be extended to use neurological observations to enable MPSD functionality to automatically administer lifesaving treatment such as, but not limited to, applying insulin or cortisone injections. Also this can be used by older people to monitor their health and need for help and provide a way to communicate their needs to a central or multiple computers and networks in a home or other places.

Another embodiment of this invention is the integration of an MPSD into an MCD that is worn through attachment to a body limb similarly to a watch. This MPSD can be a device placed internally to a person's body such as a pacemaker. The MPSD/pacemaker can indicate that the person is in need of help and provide necessary assistance in an exosuit capability for elder people.

Another embodiment of this invention is one or more SLDs that may serve as a case for a MCD or MPSD that is worn in a similar fashion to a watch and attached to a body limb or other body part and may be decoupled from the MCD or MPSD.

Another embodiment of this invention is an MPSD or an MPSD integrated into an MCD that is integrated into a strap, rope, or band form that can be attached in a plurality of methods to a person or other objects and locations.

Another embodiment of this invention is an SLD integrated into a strap, rope, or band form that can be attached in a plurality of methods to a person or other objects and locations.

Another embodiment of this invention is an MPSD constructed so as to be a device with the general appearance of eye glasses.

Another embodiment of this invention is the integration of an MPSD into an MCD that is worn in the general fashion of eye glasses or other visual devices such as goggles including electronic and mechanical assemblies for a plurality of purposes.

Another embodiment of this invention is the integration of one or more SLDs that are worn in the general fashion of eye glasses or other visual devices such as goggles including electronic and mechanical assemblies for a plurality of purposes.

Another embodiment of this invention is an MPSD or an SLD constructed so as to be a device that can be easily concealed through appearing as an item of a different use such as, but not limited to, a button, clasp, or article of adornment such as jewelry.

Another embodiment of this invention is an MPSD, an MPSD integrated into an MCD or an SLD worn as a separate dangling device such as a keychain or keychain attachment in general appearing like a car key fob.

Another embodiment of this invention is an MPSD coupled to an article of clothing so as to provide added functionality such as heart monitoring in a shirt, rate of speed and distance in a shoe, camera observation through a hat, and other forms of data that would be useful for monitoring personal security.

Another embodiment of this MPSD includes one or more cameras that may work separately or in unison with the MCD camera to provide three dimensional (3D) video capture or pictures (this 3D combined with GPS (location information) information can be combined with an exosuit to provide help to elderly people for physical mobility and directional assistance. For example, a combination of robotic assistance and an exosuit/MPSD would allow humans to have a richer live during the elderly years. The capability to use sensory integration/MPSD can allow a better integration between humans and monitoring air and weather health conditions. For example, allergens could be monitored (e.g., pollens) as well as air quality hazards (e.g., pollution) to protect persons sensitive or simply wanting to avoid exposure. For personal security, some sensors in the MPSD system could detect dangerous substances (e.g., poisonous gasses) that can be dangerous and alert the individual and in some circumstances also provide a preventive mechanism such as a filter face mask. The user could view in 3D on the screen by each of two camera views being displayed on ½ of the screen and the case providing a visual divider between the screens when held close to the face of the user, much like looking though a stereo photograph viewer. This MPSD captured video or pictures could be activated by a preprogrammed sensor input or other input for a plurality of monitoring methods. In this way, the holder of the MPSD could also capture pertinent evidence when a disturbance has occurred as well as playback or stream the video or pictures in real time to third parties such as the police. The MPSD may optionally be incorporated into the MCD and function through the use of application software.

Another embodiment of an MPSD is a MCD case optionally including one or more cameras that may work separately or in unison with the MCD to utilize night vision techniques such as, but not limited to, night vision light emitted from an LED and made visible on the screen of the MCD. In this way the MPSD coupled with or separately can provide an emergency night vision device giving persons a better chance of escaping a dangerous situation by using the cover of darkness. The MPSD may optionally be incorporated into the MCD and function through the use of application software.

Another embodiment is an MPSD and/or an SLD as location devices that have their location determined through the use of time of flight measurement to one or more transmitter nodes allowing for its approximate location to be provided to third parties for location monitoring. In yet another embodiment, an MPSD is a location device that has its location determined through the use of signal triangulation allowing for its approximate location to be provided to third parties for location monitoring. More than one MPSD or SLD may be employed to receive and transmit a signal so that an averaging might be used when some signals may be very weak and difficult to use well. Transmitter nodes may be inside buildings such as, but not limited to, Wi-Fi transmitters or external to buildings such as, but not limited to, cellular towers. A smoothing algorithm may be employed to provide more stable time of flight reference. The smoothing algorithm yields smoother linear curves with less extreme vacillation which corresponds better with the actual MPSD/SLD motion. The movement of the MPSD/SLD out of a set of parameters such as, but not limited to, distance from one or more transmitter nodes could be used to trigger a plurality of alarms and methods to request help from third parties.

Another embodiment is a mobile system using time of flight location technology. The use of signal transmission between the MCD and one or more MPSD and one or more SDL would be used. All components of this system could travel easily to a new destination and be set-up into a temporary monitoring system as a new location such as a hotel room. The time of flight of signals between all devices would be measured and used to indicate movement and relative position between devices. For example, a change in a position of a SLD on a door relative to the MCD could cause an alarm (e.g., a person is sleeping in a hotel room with his smart phone (MCD) beside him) to sound an alarm in the MCD but also third party devices through preprogrammed responses (e.g., set-off a hotel alarm or call 911). Another example of use would be for a traveling parent holding a MCD to be able to monitor children having their own MCDs, MPSDs and/or SLD in their possession or attached to their persons. Relative position and likely distance could be monitored to keep a group together and if a member gets too far away to move in their direction to find them (e.g., a metal detector uses signal bounce to lead the user to the metal object, but in this case the seeking MCD uses monitoring of the time of flight of signals to get closer to the person or child holding another MCD, MPSD, or SLD). Further, this approach could be used to identify "good devices" that are known and "bad devices" that are unknown and could be intruders entering into a monitored area. In one use, the MCD could be removed and the MPSD and SLDs could continue to monitor and collect data such as within a hotel room. Upon request, or when a device is triggered, the MPSD and or SLD could provide a report of any changes in movement (e.g., a window or door) or the intrusion or an unknown signal into the monitoring area. The collected data could be provided to one or more MCDs and third parties through a plurality of communication links. For example, a smart phone could remotely access one or more MPSDs and or SLDs to get a security data report and use it to determine if the monitored area has had an intruder. Another example would be for a person outside his hotel room with a smart phone to use Bluetooth protocol to access one or more MPSD and or SLDs within the hotel room to determine if an intruder is present. This could be used in the same way with an automobile.

Any of the MCD, MPSD, or SLD may include a "Find Me" button or alarm functionality. That alarm functionality would employ a plurality of methods to call for help by sending automated alarms to third party monitoring to a call for help signal to another MCD or MPSD (or relayed through another SLD). For example, a mother could use the link between her MCD or MPSD to a SLD attached to her child to monitor distance, but the child could also push the "Find Me" button if they became lost or scared. The mother would receive the alarm and use positioning technologies (e.g., time of flight of signals, triangulation, etc.) to locate the lost child. A voice link could also be established between the MCD and the SLD to provide real time communication to facilitate faster location of the lost child.

An MCD, MPSD, and or SLD could be used as a beacon to allow for return to a given location. For example, in a beacon mode, an MPSD could be left in a given location (e.g., locked to a stationary object) and provide a beacon signal for later returning to the same location. The beacon mode would use a plurality of methods to secure against tampering while in beacon mode such as, but not limited to, fingerprint recognition. The beacon mode could allow others holding an MCD, MPSD, and SLD to return to the beacon at a set time, e.g., persons camping or in a store. Another way in which the beacon mode could be used would be for the holder of the designated beacon device to be able to actuate a "beacon signal" indicating to the holders of the other MCDs, MPSDs, and SLDs to come to the location of the designated beacon devise. For example, a chaperone for a teenager field trip could call the members of the group together when time to leave a given location.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 is a block diagram depicting a communication system where a mobile device case is attached to a mobile device and a plurality of sensors is disposed remotely from the mobile device case.

FIG. 2 is a block diagram depicting a communication system where a mobile device case is attached to a mobile device and a plurality of sensors are coupled to the mobile device case.

FIG. 3 is a block diagram depicting a mobile device, a mobile device case, a plurality of sensors and the relationships between these components.

FIG. 4 is a block diagram depicting a mobile device, a mobile device case, a plurality of sensors coupled to the mobile device case and the relationships between these components.

FIG. 5 is a block diagram depicting two sets of mobile device and mobile device case, a plurality of sensors and the relationships between these components.

PARTS LIST

Figure 6:
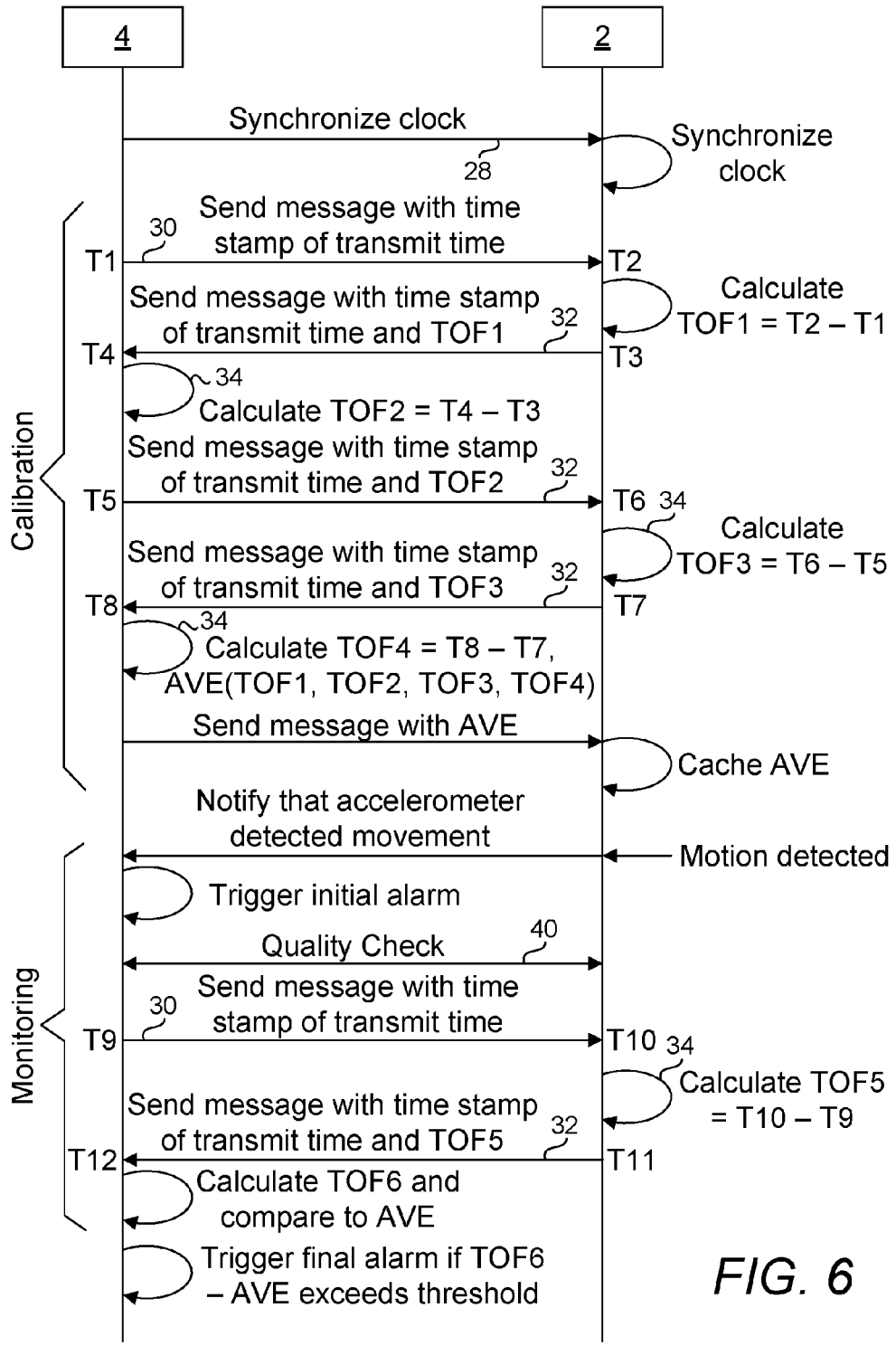
FIG. 6 is a sequence diagram depicting a means by which a mobile device case is used in conjunction with a mobile device to detect a movement of the mobile device case.

2—mobile device case
4—mobile device
6—sensor
8—communication between mobile device case and sensor
10—communication between mobile device case and mobile device
12—communication between mobile device cases
14—communication between mobile devices
16—communication between mobile device and sensor
18—radius of trajectory of sensor C
20—distance between sensor A and mobile device case B
22—distance between mobile device case B and sensor C
24—total distance between sensor A and sensor C
26—communication between sensors
28—step of synchronizing clock time
30—step of sending message with time stamp of transmit time
32—step of sending message with time stamp of transmit time and calculated time of flight
34—step of calculating time of flight
36—plane
38—subgroup
40—quality check
42—first frequency originator device, e.g., mobile device
44—second frequency originator device, e.g., mobile device
46—broadcast signal having first frequency
48—broadcast signal having second frequency
50—frequency originator device, e.g., long range acoustic device (LRAD)
52—arc representing distance from frequency originator device
54—frequency receiver device, e.g., mobile device

PARTICULAR ADVANTAGES OF THE INVENTION

The present personal security system enables the use of a ubiquitous device, such as a mobile device, e.g., smart phone, in conjunction with a conveniently physically and functionally paired case, to function as a system to provide personal security, such as the determination of a situation requiring the user's attention.

The present localization system enables the use of a ubiquitous device, such as a mobile device, e.g., smart phone, in conjunction with a frequency originator device, which can be another ubiquitous device, such as a mobile device, e.g., smart phone.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The terms "large motion" or "large movement" are used herein to mean a movement that is sufficient large, e.g., as a result of the opening or closing of a door, a position shift of about 5% per second, a position shift of at least about 1 inch per second, etc. A vibration caused by the operation of a common household appliance or air movement due to forced circulations in an indoor space shall not be considered to have the capability of causing a large motion or large movement (excluding some devices such as washing machines and clothes driers).

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not. Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the figures and their previous and following description.

FIG. 1 is a block diagram depicting a communication system where a mobile device case is attached to a mobile device 4 and a plurality of sensors 6 is disposed remotely from the mobile device case 2. The mobile device case 2 is physically and functionally coupled to the mobile device 4. In one embodiment, the mobile device case 2 is a cradle in which the mobile device is seated such that the mobile device case 2 provides protection against accidental impact, etc. A mobile device case 2 is essentially a controller capable of communication with a mobile device 4 and one or more sensors 6. "Communication," as used herein is defined as communication via various communication means and protocols, e.g., Bluetooth, Global Positioning System (GPS), wireless local area network (Wi-Fi), etc. In one embodiment, an application capable of being installed in a mobile device is provided to cause the mobile device, via its transmitter and receiver, to communicate with a mobile device case 2 and a sensor 6. Each mobile device case 2 and sensor 6 may alternatively be equipped with a controller, transmitter and receiver to facilitate communication of one of these devices with another device. In one embodiment, a sensor 6 is an accelerometer between 2 g-8 g. In another embodiment, a sensor 6 is a 3-axis digital gyro with programmable full-scale ranges of about ±250, ±500, ±1000, and ±2000 degrees/sec (dps), which is useful for precision tracking of both fast and slow motions. In yet another embodiment, a sensor 6 is a low-power digital three dimensional (3D) magnetic sensor capable of measuring local magnetic fields up to about 10 Gauss with output data rates (ODR) up to 80 Hz. In one embodiment, a receiver is a device capable of receiving signals or messages transmitted as waves (e.g., radio and sound, etc.) having a frequency response falling within or outside that of the frequency response of a typical microphone which ranges from about 20 Hz to about 20 kHz.

FIG. 2 is a block diagram depicting a communication system where a mobile device case 2 is attached to a mobile device and a plurality of sensors 6 are coupled to the mobile device case 2. In one embodiment, a mobile device case 2 comprises a plurality of sensors 6. In another embodiment, a plurality of sockets are made available on-board the mobile device case 2 and configured for receiving sensors 6. In use, only the necessary sensors 6 are inserted in the sockets and functionally connected to the mobile device case 2.

FIG. 3 is a block diagram depicting a mobile device 4, a mobile device case 2, a plurality of sensors 6 and the relationships between these components. The mobile device 4 is configured to communicate with the mobile device case 2 via communication 10 and each of the sensors 6 via communication 16. The mobile device case 2 is configured to communicate with each of the sensors 6 via communication 8. A mobile device case 2 may communicate with another mobile device case 2 via communication 12. A mobile device 4 may communicate with another mobile device 4 via communication 14. A sensor 26 may be configured to communicate with another sensor via communication 26. In one embodiment, the present system includes an application adapted to a mobile device 4 and at least one sensor 6. In another embodiment, the present system includes an application adapted to a mobile device 4, at least one mobile device case 2 and at least one sensor 6.

FIG. 4 is a block diagram depicting a mobile device 4, a mobile device case 2, a plurality of sensors 6 coupled to the mobile device case 2 and the relationships between these components. In one embodiment, the sensors communicates directly with the mobile device case 2 as if the sensors 6 are directly wired to the mobile device case 2 when the sensors are seated in the sockets of mobile device case 2. In another embodiment, the sensors 6 communicate wirelessly to the mobile device case 2 as if the sensors are mounted wirelessly from the mobile device case 2.

FIG. 5 is a block diagram depicting two sets of mobile device 4 and mobile device case 2, a plurality of sensors 6 and the relationships between these components. This diagram is provided essentially to demonstrate that, in addition to communicating between dissimilar devices, communication may also occur between components of the same make, i.e., a mobile device 4 to another mobile device 4 and a mobile device case 2 to another mobile device case.

FIG. 6 is a sequence diagram depicting a means by which a mobile device case 2 is used in conjunction with a mobile device to detect a movement of the mobile device case 2. The system for carrying out such detection includes a mobile device case 2, a mobile device 4 and an accelerometer capable of detecting motion of the mobile device case 2. In this example, the mobile device case 2 is used to detect and verify a movement of the mobile device case 2 that is considered sufficiently severe to warrant an action to alert a user. The mobile device case 2 is attached to an object, the motion of which is to be detected while the mobile device 4 is placed in the vicinity the user such that the user can be alerted via an output of the mobile device 4. The mobile device 4 first initiates clock synchronization (step 28) with the mobile device case 2 by sending its clock time to the mobile device case 2. The time stamp at which the clock time starts to be transmitted is assumed to be the clock time. As it takes a finite amount of time for such transmission to be received at the mobile device case, the time at which such transmission to be received at the mobile device case 2 is no longer the clock time. The mobile device case thus sets its clock time with a time that corresponds to the clock time received and the duration for the clock time to be transmitted. Alternatively, the mobile device case 2 may initiate clock time synchronization. Upon synchronizing the clock of the mobile device case 2, the mobile device case 2 and the mobile device 4 are ready for a calibration process which involves averaging the time of flight of a message between the two devices 2, 4. The mobile device 4 initiates calibration by sending a message with the time stamp at which the message is started to be transmitted as in step 30. Upon receipt of the message, the mobile device case 2 then calculates (step 34) the time of flight of the message, i.e., the time it takes for the message to be transmitted from the mobile device 4 to the mobile device case 2 (time of flight). This is followed by a transmission from the mobile device case 2 which includes the time stamp at which a message started to be transmitted and the time of flight just calculated as shown in step 32. Upon receipt of the message, the mobile device 4 then calculates the time of flight of the message. The process of enabling the calculation of a time of flight by one device (by making available the time stamp of a transmission) in another device, the process of calculating the time of flight of a message by another device and the process of notifying another device of the time of flight is repeated until a satisfactory number of transmissions between the devices or until a satisfactory average of time of flight has been obtained. A satisfactory average of time of flight may be one which is tied to a satisfactory standard deviation. In this example, the calibration concludes with the averaging of four values of time of flight. The time of flight data is made available in both of the devices 2, 4. Alternatively, the time of flight and the average time of flight data may be retained in one of the two devices and the average time of flight data is only made available to the device which requires it. After the time of flight has been calculated, the mobile device case 2 is now ready to detect motion.

In order to eliminate false detection, the system must detect a motion warranting a response from the user in conjunction with the time of flight data indicating a distance change has occurred. A triggering of the accelerometer signals that a motion has been detected and a notification is sent from the mobile device case 2 to the mobile device 4. This event marks the start of the monitoring phase of the sequence. An initial alarm may be emitted to the user signaling the detection a motion has been detected in the mobile device case 2. Alternatively, the monitoring phase may start immediately after clock synchronization has completed. Upon detecting a motion with the accelerometer, a question remains as to whether or not the motion is caused by an action which warrants a response at either the mobile device 4 or the mobile device case 2. Upon receiving the notification from the mobile device case 2, the mobile device 4 initiates a process where one or more values of the time of flight are obtained. The process in getting a time of flight value is similar to the process in which a time of flight value is calculated in the calibration process. As the time of flight of a message corresponds the distance between the mobile device case 2 and the mobile device 4, a movement in the mobile device case 2 causes the time of flight of a message transmitted between the two changes. Therefore, a significant deviation of the time of flight from the average time of flight previously established in the calibration process may signal a large change in the position of the mobile device case 2 and an alarm may be triggered at the mobile device 4 to indicate such event. If an additional device, such as a sensor 6 or a mobile device case 2 were to be added to the network, clock synchronization may be performed to the entire network or to the newly added device alone. A request for clock synchronization may be initiated via the device to be added. In one embodiment, such request is actuated via a button functionally connected to such request. Although the example depicted in FIG. 6 includes a mesh network of a mobile device case 2 and a mobile device 4, two or more mobile devices 4 may be used in place of the combination of a mobile device case 2 and a mobile device 4. In general, the type of clock time synchronization is selected based on the proximity of the devices involved to each other. In an embodiment where devices are disposed in close proximity, mobile devices are synchronized via a peer-to-peer mechanism. A peer-to-peer mechanism includes, but not limited to, the use of a Near Field Communication (NFC), Bluetooth or Wi-Fi, etc. transmit-receive pair to transmit the clock time and transmit time of a first mobile device to a second mobile device where its clock is reconciled with the clock time of the first mobile device. In an embodiment where devices are disposed apart at great distances, mobile devices clock time synchronization may be synchronized via a web server. The clock time and transmit time of a first mobile device are transmitted via a web connection to a second mobile device where its clock is reconciled with the clock time of the first mobile device. A web server may be accessed via a mobile device wirelessly or by hard wire.

In order to determine to a high degree of certainty that a large motion has indeed occurred, a quality check 40 including the following two quality checks may be performed.

An Example of a Quality Check for Confirming that a Movement has Begun

Just after the initial distance between devices is determined (first measurement after any calibration loop), the device can be disposed in a stand-by mode to conserve power. If the accelerometer detects a movement while in standby mode, the device having the accelerometer wakes up and starts to send time data such that time of flight (TOF) data can be calculated in the device receiving the time data. The accelerometer serves here to both provide a confirmation of movement and allow for a power conserving stand-by mode. In the event that environmental factors may give difficult signal readings (e.g., moving steel objects that could cause signal reflections that could falsely be interpreted as movement), such quality check can reduce extraneous or unreliable time data. The use of a standby mode allows for less power usage by only making transmissions when movement begins. It is important to note here that both devices in a two device system of a phone and a sensor could use sleep mode, but TOF calculations need to begin if either one of the two begins to move.

Examples of a Quality Check for when Devices are in Motion and are Regularly Making TOF Calculations Scenario A: Accelerometers in both devices compare relative speed to each other.

Scenario B: Gyros in both devices compare relative angle of movement off of horizontal between both devices.

Scenario C: Compasses in both devices compare relative directional heading between both devices.

Scenarios A, B, and C contribute to helping to maintain good relative position between devices while TOF method continues to establish relative distance, especially for use when viewed on a mobile device screen with a grid reference. Note that compass and gyro are used only to assist in orientation as in quality check and they are used for screen display/interface and do not detract from TOF.

Figure 7:
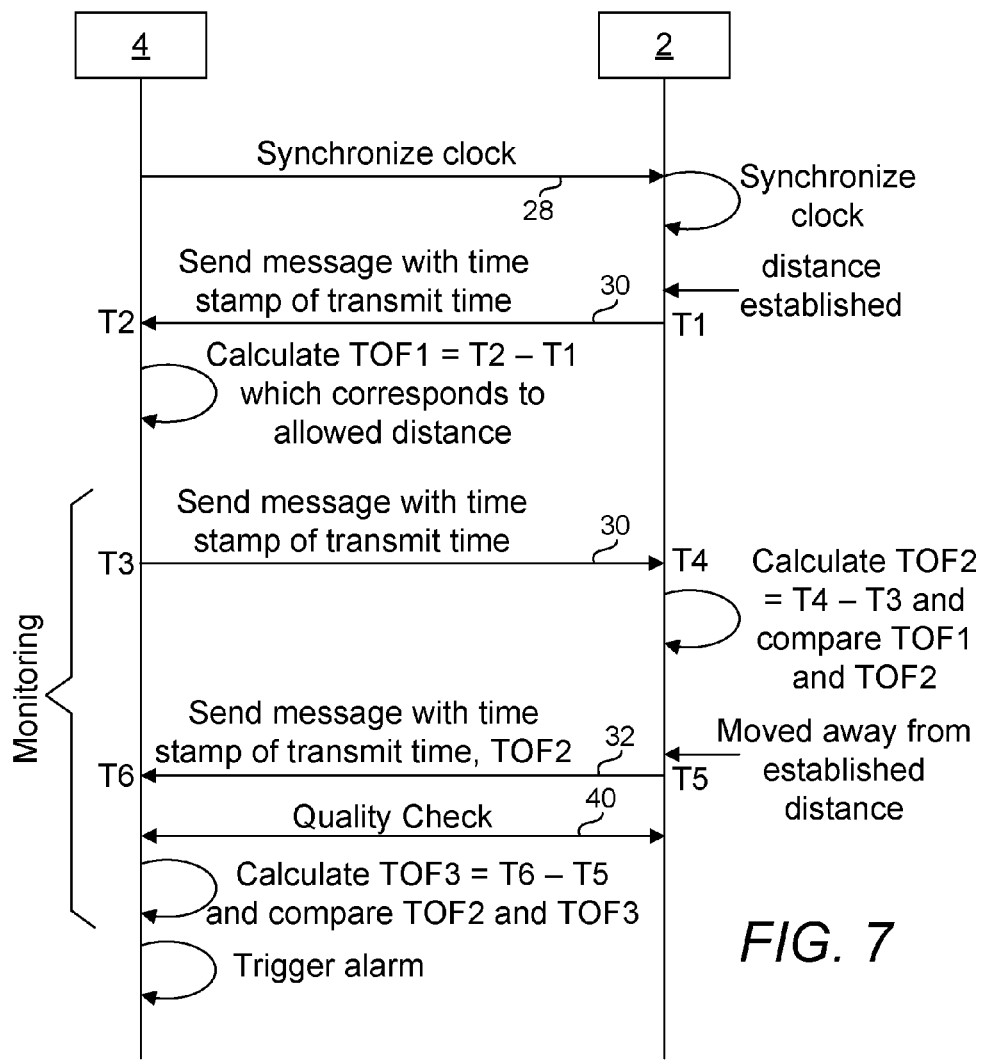
FIG. 7 is a sequence diagram depicting a means by which a mobile device case is used in conjunction with a mobile device to detect a condition where the distance between the two devices has grown beyond a predetermined threshold.

FIG. 7 is a sequence diagram depicting a means by which a mobile device case 2 is used in conjunction with a mobile device 4 to detect a case where the distance between the two devices 2, 4 has grown beyond a predetermined threshold. In one aspect, an individual to be monitored is given the mobile device case 2 while an individual monitoring the mobile device case 2 uses the mobile device 4. Again, the clocks of the two devices 2, 4 are first synchronized. Upon synchronizing the clocks in the two devices 2, 4, the devices enter a monitoring phase. Prior to the monitoring phase, a time of flight corresponding to the maximum distance allowed between the two devices must first be established. At the start of the monitoring phase, the mobile device case 2 initiates communication by sending a message with the time stamp at which the message is started to be transmitted as in step 30. Upon receipt of the message, the mobile device 4 then calculates the time of flight of the message, i.e., the time it takes to the message to be transmitted from the mobile device 4 to the mobile device case 2 (time of flight). This is followed by a transmission from the mobile device case 2 which includes the time stamp at which a message starts to be transmitted and the time of flight just calculated as shown in step 32. Upon receipt of the message, the mobile device 4 then calculates the time of flight of the message and the present time of flight is compared to the previously calculated time of flight. For simplicity, the present diagram shows only two sets of time of flight. In practice, many more sets of time of flight are obtained and analyzed. If a large discrepancy between the two values (which indicates a departure of a device from another) has been detected, an alarm may be activated to indicate such an event.

Figure 8:
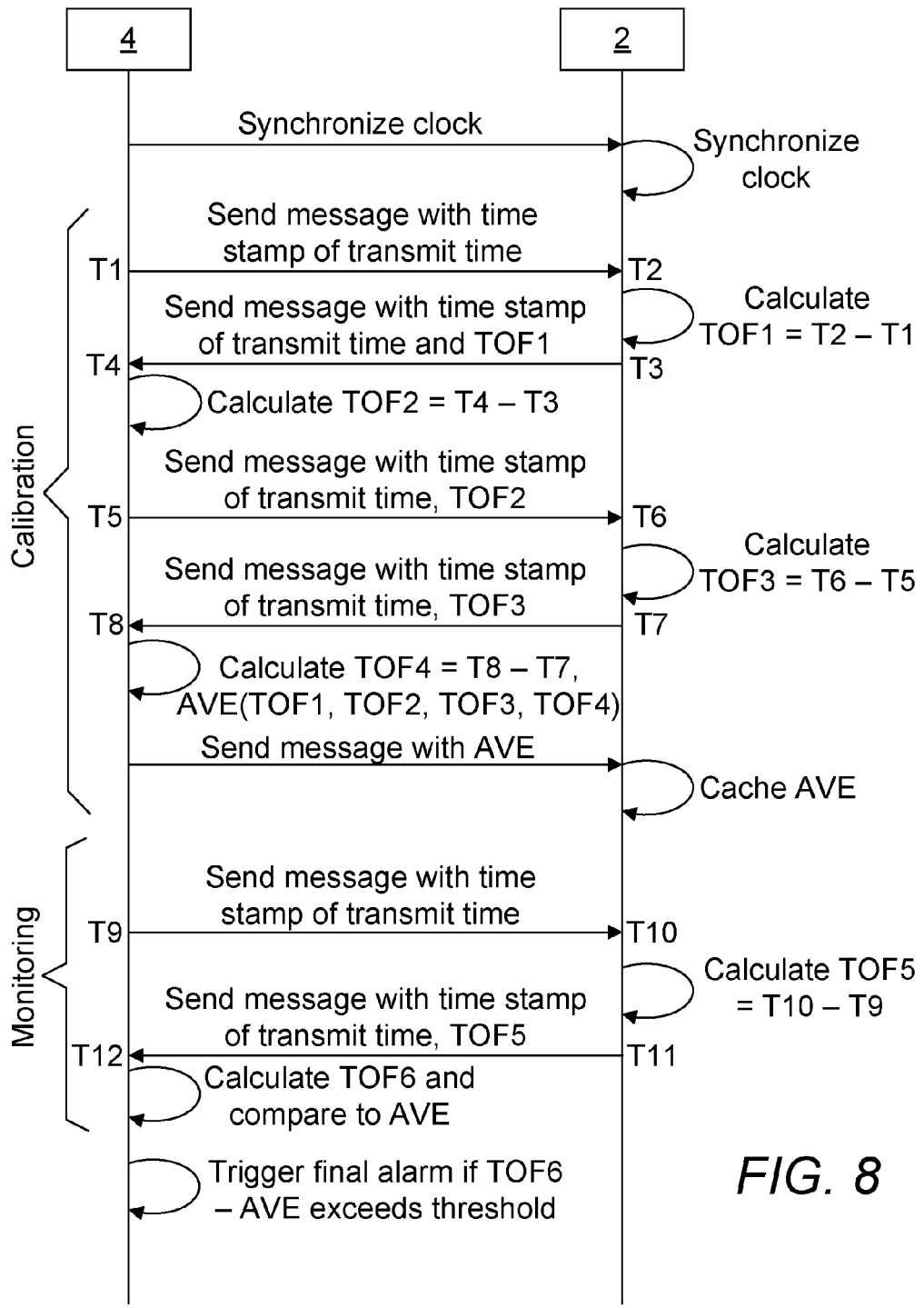
FIG. 8 is a sequence diagram depicting a means by which a mobile device case is used in conjunction with a mobile device to detect an intrusion in a space between the two devices.

FIG. 8 is a sequence diagram depicting a means by which a mobile device case 2 is used in conjunction with a mobile device 4 to detect an intrusion in a space between the two devices. The two devices 2, 4 are spread apart a distance such that a space (between the two devices) in which an intrusion is to be detected is formed. Similar to the scenario of FIG. 6, the two devices are clock synchronized and calibrated. The main difference between the present scenario and the one shown in FIG. 6 lies in the lack of an accelerometer in the present scenario. An intrusion in the space comes as a disturbance or a change to values of the sets of time of flight. If a present time of flight value varies significantly from the previous time of flight value, an intrusion is said to have been detected. In another embodiment, the present system seeks the entry of a new, unknown signal into its monitored area (e.g., various types of signals such as transmissions from the phone of an intruder or the signal of a remote control device). It should be noted that the system may also use changes in the time of flight of signals to detect if there is movement in the room that does not cause a sensor to move.

Figure 9:
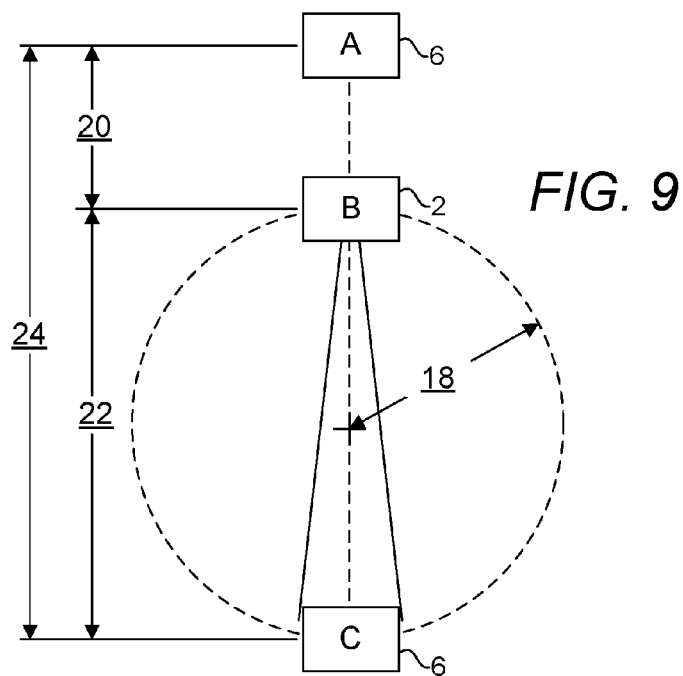
FIG. 9 is a diagram depicting an example of the use of a mesh network for communication between multiple devices or detection of one or more devices in a network.

FIG. 9 is a diagram depicting an example of the use of mesh network for communication between multiple devices or detection of one or more devices in a network. In this example, sensor A and mobile device case B are disposed at fixed locations at distance 20 apart and sensor C is mounted to an object configured to travel in a circular trajectory as shown in FIG. 9. The mobile device case B includes a directional antenna configured to detect an object in a direction coaxial to the direction from sensor A to mobile device case B. It is assumed that sensor A is not capable of directly detecting sensor C or providing a distance measurement between sensor A and sensor C, due to an obstruction or not having the same method of communication. It is further assumed that when sensor C comes within the field of view of the directional antenna, the mobile device case 2 will be capable of detecting the presence of sensor C. Therefore, although sensor A is not capable of detecting the presence of sensor C in the mesh network depicted in FIG. 9, the mobile device case 2 may relay location of sensor C relative to sensor A to sensor A if the radius 18 of sensor C trajectory is known. For example, in the positions shown, sensor A is disposed at a total distance 24 of distances 20 and 22. Distance 22 is twice radius 18. In an embodiment not shown, the mobile device case B may be replaced with a mobile device having a built-in antennae.

Figure 10:
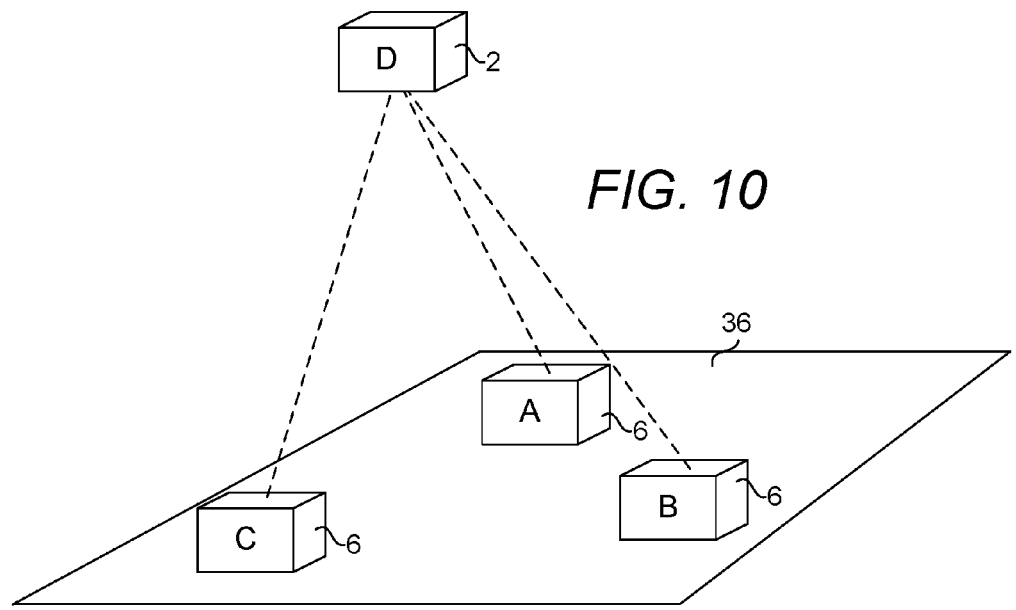
FIG. 10 is a diagram depicting an example of the use of a mesh network for locating a device.

FIG. 10 is a diagram depicting an example of the use of a mesh network for locating a device. In this example, sensors A, B and C are disposed at fixed known locations substantially upon a floor 36. The location of the mobile device case D, in relation to the sensors A, B and C, is to be determined by triangulation. Distances D-C, D-A and D-B are estimated based on the time of flight of signals communicated between each of the sensors A, B and C and the mobile device case 2. As there are two possible solutions, by placing the sensors A, B and C on the floor 36, the location of the mobile device case D relative to the sensors A, B and C can be estimated. The possible location of mobile device case D "under" the floor 36 as the other solution can be eliminated. Sensors A, B and C may alternatively be disposed at any location and not on a floor. If the signals communicated between the devices could travel through a floor, the strength of the signals may provide clue as to the proper solution as weak/problematic signals may indicate the second solution "under" the floor.

Figure 11:
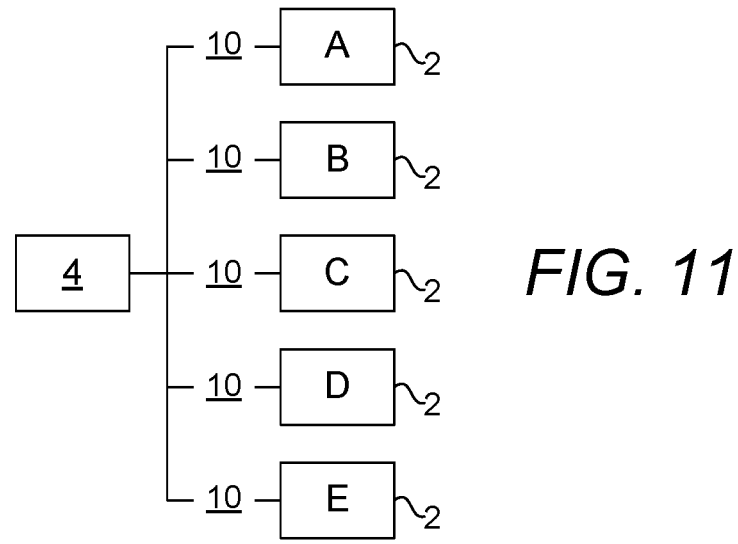
FIG. 11 is a block diagram depicting a mobile device, a plurality of mobile device cases and the relationships between these components.
Figure 12:
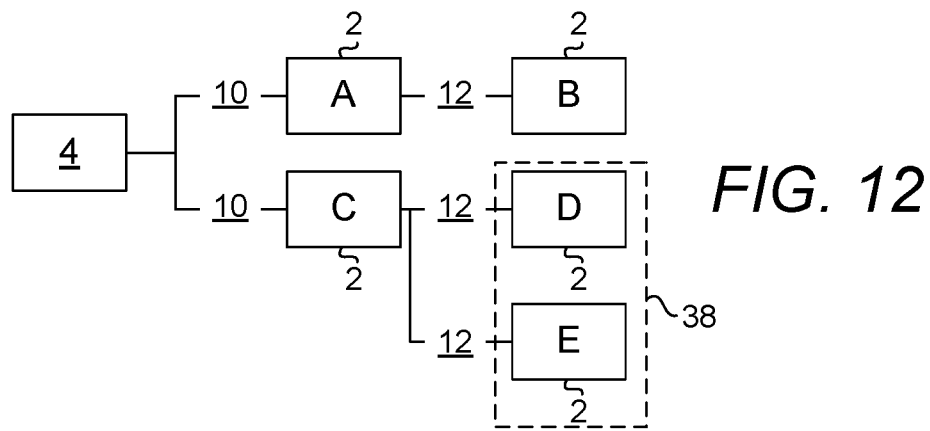
FIG. 12 is a block diagram depicting the components of FIG. 11 and functional connections between these components that are different than those disclosed in FIG. 11.
Figure 13:
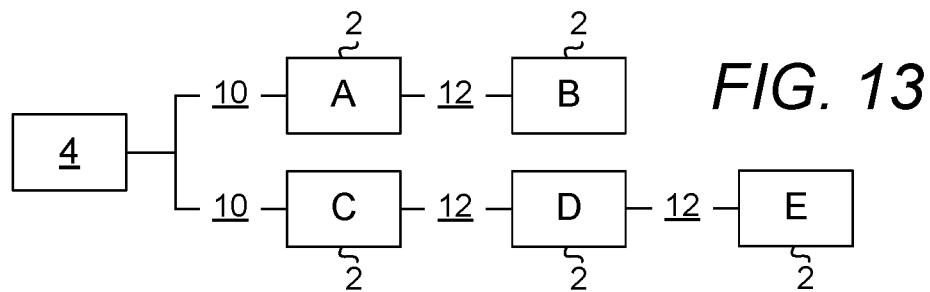
FIG. 13 is a block diagram depicting the components of FIG. 11 and functional connections between these components that are different than those disclosed in FIG. 11.

FIG. 11 is a block diagram depicting a mobile device 4, a plurality of mobile device cases and the relationships between these components. Each of the mobile device cases 2 is functionally connected directly to the mobile device 4. FIG. 12 is a block diagram depicting the components of FIG. 11 and functional connections between these components that are different than those disclosed in FIG. 11. In this mesh network, each of mobile device cases A and C is functionally connected directly to the mobile device 4. Mobile device case B is functionally connected to another mobile device case, i.e., mobile device case A. Each of mobile device cases D and E is functionally connected to another mobile device case, i.e., mobile device case C. In one aspect, it is possible to extend the range between mobile device 4 and a mobile device case 2 by functionally indirectly connecting a mobile device case (such as mobile device cases B, D and E) to the mobile device 4. In another aspect, mobile device cases 2 may alternatively be functionally grouped into one or more subgroups 38. A subgroup 38 can be viewed as a group where its constituents (e.g., mobile device cases D and E) functionally cooperate to yield a result that can then be relayed through at least one of the constituents to another component in the mesh network, e.g., the mobile device 4. For instance, if each of the mobile device cases D and E is equipped to take temperature readings, mobile device cases D and E may be configured to provide an average temperature reading based on the readings of mobile device cases D and E. FIG. 13 is a block diagram depicting the components of FIG. 11 and functional connections between these components that are different than those disclosed in FIG. 11. FIG. 13 depicts another possible means of forming a mesh network. In this example, mobile device case E is functionally connected to mobile device case D. In one embodiment, a subgroup is formed by bringing two components within the sphere of influence of each other and using a trigger, e.g., a button press to cause such relationship to be established. In another embodiment, a subgroup is formed by bringing components within the sphere of influence of each other such that a list of components present within the sphere of influence is visually presented and a selection can be made as to the components that form a subgroup.

Alternatively, the mobile device cases 2 of the examples depicted in FIGS. 11-13 may be replaced with sensors 6 and a mobile device case 2 may be used in place of the mobile device 4.

Figure 14:
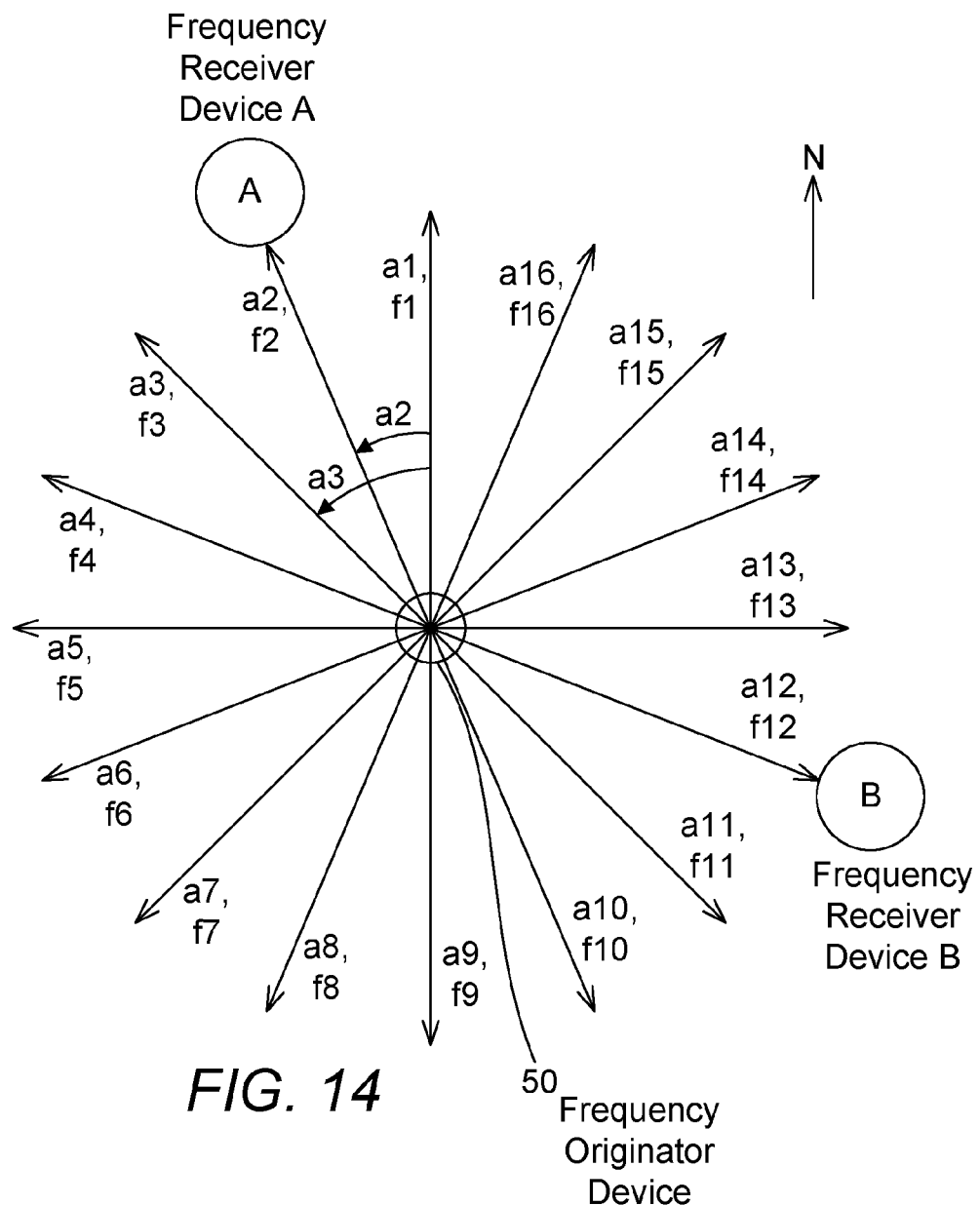
FIG. 14 is a diagram depicting one embodiment of a present localization system.

FIG. 14 is a diagram depicting one embodiment of a present localization system. In this embodiment, the location determination of a frequency receiver device (e.g., device A or B) is made based on the direction at which a signal or message is received from a frequency originator device. A frequency receiver device disclosed herein can be a mobile device already equipped with an on-board or built-in or external microphone, a device capable of receiving signals or messages transmitted as waves having a frequency response falling within or outside that of the frequency response of a typical microphone which ranges from about 20 Hz to about 20 kHz. A frequency receiver device which is said to have a frequency response of the typical range of frequencies can reproduce all frequencies within this range but not outside of this range. A frequency receiver device capable of a frequency response outside that of this range is adapted to reproduce frequencies outside of this range. A frequency originator device disclosed herein can be a broadcaster or any devices adapted to transmit signals or messages in waves having a frequency. In one embodiment, the frequency originator device 50 is a long range acoustic device (LRAD) which can be configured to broadcast signals of various frequencies at various orientations. In another embodiment, a phased array speaker system is used as the frequency originator device. Referring back to FIG. 14, at orientation a2, a signal having a frequency of f2 is broadcasted from LRAD. At orientation a12, a signal having a frequency of f12 is broadcasted from LRAD. Other signals of various other frequencies are broadcasted at their respective frequencies. At its depicted location, mobile device A (a frequency receiver device) is disposed at a location for receiving a signal at orientation a2 of frequency f2. In practice, LRAD can be a wave emitting device that is mounted on a rotary table such that it may be configured to emit signals of various frequencies at high speed depending on its orientation about its axis of rotation. Alternatively, multiple wave emitting devices may be disposed at different orientations instead, each configured to emit signals at a fixed frequency and pointed outwardly from a center. The latter is more robust as any delays due to the physical rotation of the wave emitting device as in the former will not occur. Each frequency originator device is programmed to emit a message in the direction the frequency originator device is disposed. Each message is therefore referred to as a directional message as only a frequency receiver device positioned within the field of influence of the directional message can receive this directional message.

In this embodiment, the cost of operating both the frequency originator device and the frequency receiver device is minimal. Most of the energy consumption of the present system lies in the broadcast of signals from the frequency originator device. When compared to a conventional localization device, e.g., a GPS system which not only requires external signals, e.g., those of satellites and relay stations but also may succumb to inclement weather, the present localization system utilizes smaller amounts of resources. There is neither satellite infrastructure nor any third party fees required in the present systems. The present systems are self-contained system without requiring external fees for signal information, e.g., GPS. The present systems can be readily used at low costs as they utilize existing communication means in sending alarms or danger notices, e.g., over an internet, data, or text, connection that would already be a part of the mobile device owners services. In the present systems, additional monitoring fees are not required to notify the authorities as the systems that can directly call the police through the mobile device, e.g., mobile phone. The energy consumption in the frequency receiver device is minimal as compared to other means of localization. The present systems utilize low energy consuming technology, e.g., sound frequencies and as a result, the devices in the systems do not need to be powered by large amounts of on-board battery power, reducing the battery costs which constitute a significant total cost portion in any mobile device. As the present systems are readily movable, they can travel easily with their owner from one location to another, relieving the need for multiple systems at multiple locations. In any systems disclosed herein, a speaker that is built-in or external to a mobile device can be used as a frequency originator device while a microphone that is built-in or external to the mobile device can be used as a frequency receiver device. As these components are typically already bundled with a mobile device, e.g., cell phone, no additional equipment or costs are required. In terms of the processors of the present systems, high volume or mass produced mobile devices such as a cell phone or tablet, etc., are readily equipped with such parts. Although a cell phone or tablet is used for other purposes, such as personal communication, etc., a cell phone or tablet is available at a much lower cost than a lower volume central processing unit for a security system due to economy of scale in the case of the cell phone or tablet. Compared to existing localization systems designed primarily for use in an outdoor, unobstructed environment, the present systems function by utilizing signals coming from devices already in the system or that have traveled together at the same time into an enclosed location. The present systems therefore do not rely on an existing infrastructure in the building to provide a signal source or data (e.g., they do not rely on a Wi-Fi being present).

In determining the location of a frequency receiver device with respect to a frequency originator device of a known location, the following steps are taken. First, the distance between the frequency receiver device and the frequency originator device is determined. In one embodiment, this is achieved by first synchronizing a clock of the frequency originator device with a clock of the frequency originator device. Then a directional message containing a broadcast time at which the directional message is broadcasted from the frequency originator device at an orientation about an axis of rotation of the frequency originator device and received by the frequency receiver device. The time of flight of the directional message is obtained by calculating the difference between a receive time at which the directional message is received by the frequency receiver device and the broadcast time. The distance between the frequency originator device and the frequency receiver device is determined by multiplying the time of flight of the directional message by the speed of the directional message. This is followed by determining the frequency of the directional message and determining the orientation of the directional message with respect to the frequency originator device by looking up a table containing orientations of messages about the frequency originator device with respect to the frequency of the messages. The location of the frequency receiver device can then be calculated based on the orientation of the directional message and the known location of the frequency originator device. It shall be noted that the known location is movable. In other words, it is the relative positioning of the frequency receiver device and the frequency originator device that is important. For example, in an application where a frequency receiver device is configured to follow a frequency originator device at a distance, the frequency originator device may be in a moving state at all times, but the frequency receiver device must move with the frequency originator device to maintain a preprogrammed distance.

Figure 15:
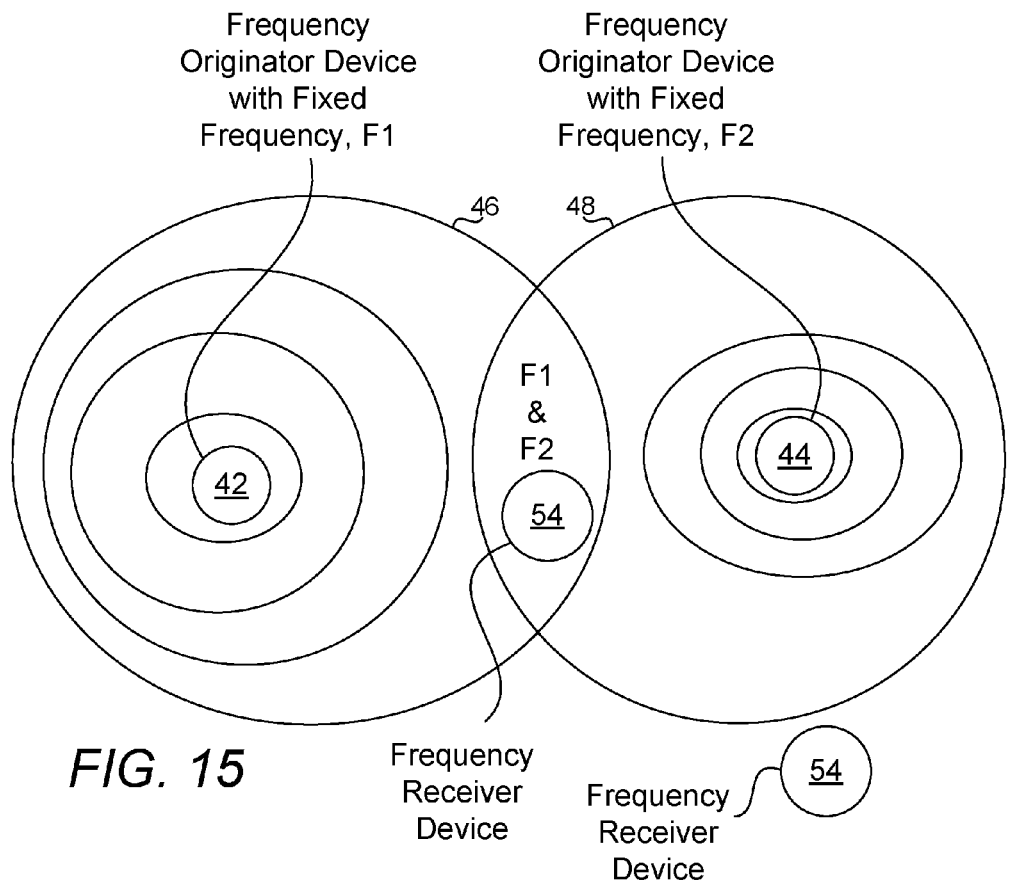
FIG. 15 is a diagram depicting another embodiment of a present localization system.
Figure 16:
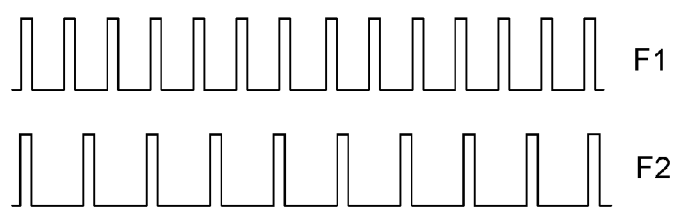
FIG. 16 is a diagram showing two different frequencies broadcasted using two different frequency originator devices as shown in FIG. 15.
Figure 17:
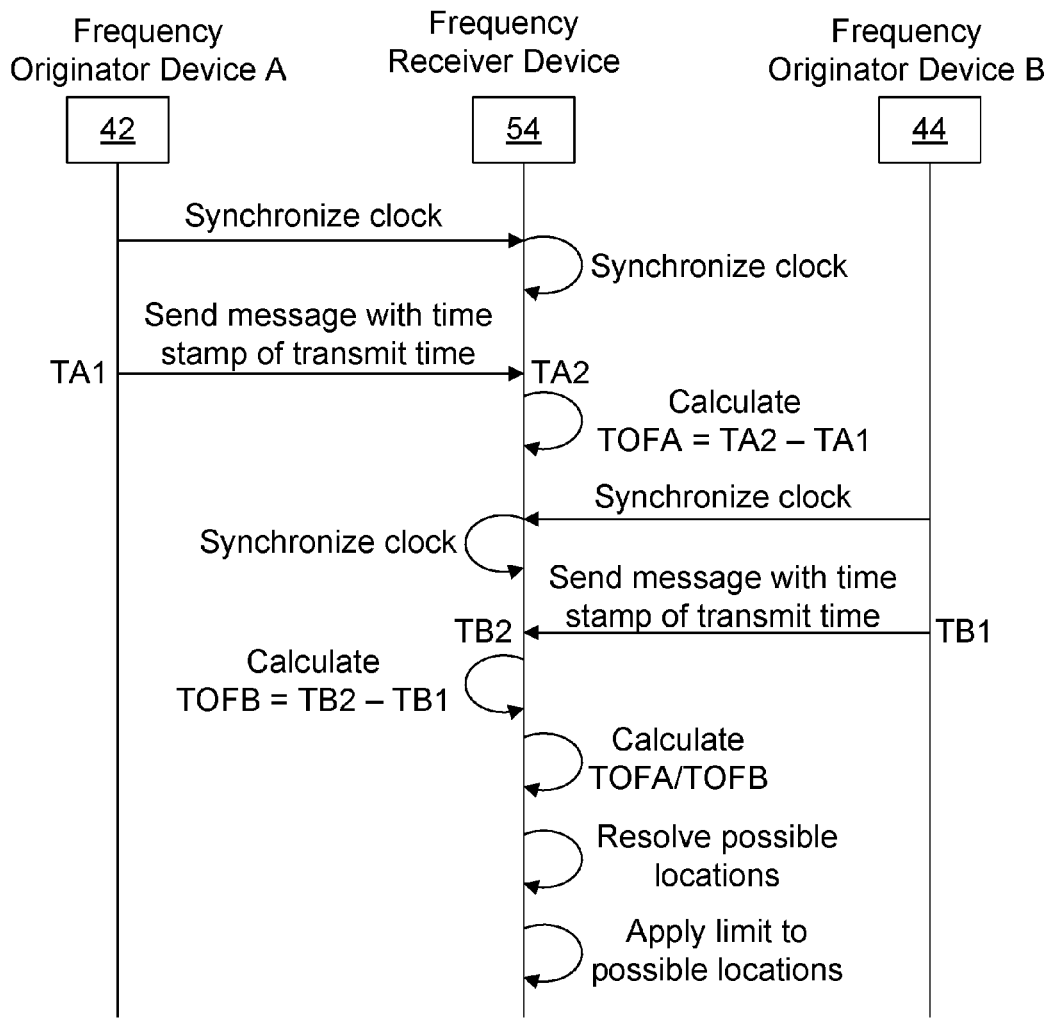
FIG. 17 is a sequence diagram depicting a means by which a device may be localized.
Figure 18:
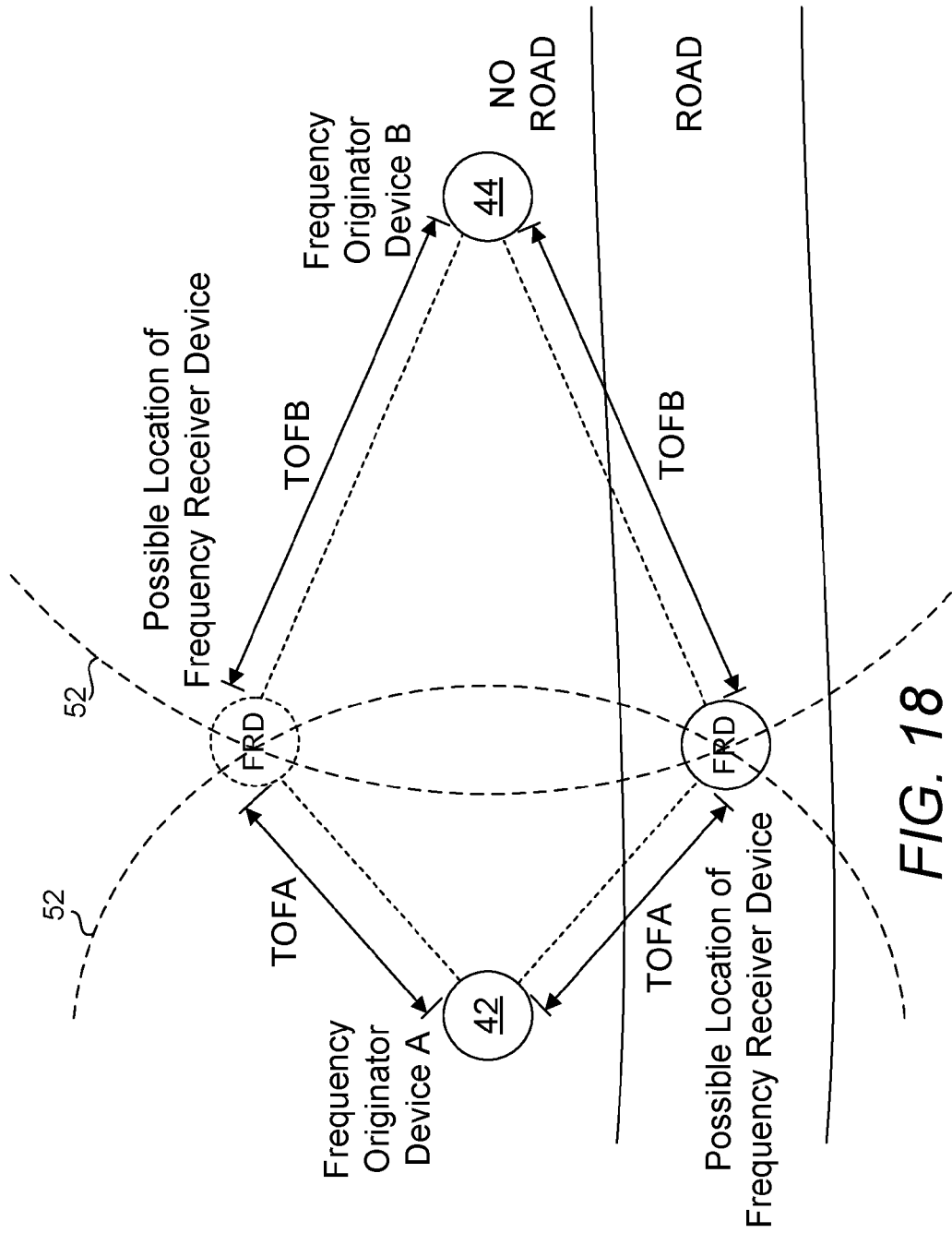
FIG. 18 is a plan view depicting a means by which localization is perfected with additional information.

FIG. 15 is a diagram depicting another embodiment of a present localization system. In this embodiment, two non-directional frequency originator devices are provided, each used to broadcast a signal or message having a fixed frequency, F1 or F2. FIG. 16 is a diagram showing signals or messages of two different frequencies broadcasted using two different frequency originator devices as shown in FIG. 16. Note the difference in wavelengths between the two messages. FIG. 17 is a sequence diagram depicting a means by which a device may be localized. FIG. 18 is a plan view depicting a means by which localization is perfected with additional information. In a two-dimensional space, a frequency receiver device may be said to assume one of the two possible locations as shown in FIG. 15. Referring to FIG. 18 and upon determining the distance of a frequency receiver device 54 from a frequency originator device using a method disclosed elsewhere herein, an arc 52 representing points equidistant from a frequency originator device can be disposed about the frequency originator device. In a two dimensional space, there exists two intersecting points, each representing a possible location of the frequency receiver device. In practice, a look-up table of the relative position of the frequency receiver device with respect to the ratio of the time of flight of messages 46, 48 (TOFA/TOFB) can be used to reduce real time computations in one or more controllers, e.g., one disposed in the frequency receiver device or one or both of the frequency originator devices of the localization system in resolving the location of the frequency receiver device given the locations of the frequency originator devices A and B. TOFA and TOFB represent the time of flight corresponding to the distances between the frequency receiver device and the frequency originator device A 42 and B 44, respectively.

The following steps are taken in determining the location of a frequency receiver device with respect to at least two frequency originator devices where the location of each is known. In the embodiment shown in FIG. 17, this is achieved by first synchronizing a clock of the frequency receiver device with a clock of one of said at least two frequency receiver devices. This is followed by receiving by the frequency receiver device, a message containing a broadcast time at which the message is broadcasted from the frequency originator device. Then a time of flight of the message is obtained by calculating the difference between a receive time at which the message is received by the frequency receiver device and the broadcast time. The above steps are repeated with a second frequency receiver device to result in a first time of flight, TOFA and a second time of flight, TOFB. A ratio of TOFA and TOFB is then calculated. Possible locations of the frequency receiver device are then resolved by looking up a table containing possible locations of the frequency receiver device with respect to the ratio of the first and second time of flight. The table is essentially a look-up table listing the TOFA/TOFB ratio with respect to the locations of the frequency receiver device relative to the locations of the frequency originator devices. As there are two possible solutions or locations in each two dimensional space as shown in FIG. 18, additional information is required to rule out one of the possible locations. At least one limit is applied to the possible locations to select one of the possible locations with high certainty. In the example shown in FIG. 18, frequency originator devices A and B are overlaid atop a map depicting a road. In this example, as it is assumed that the frequency receiver device is used for road navigation, the applied assumption or limit results in a plausible solution which points to the location of the frequency receiver device disposed on a road instead of a location where no roads exist. In another embodiment, the limit includes the time of flight results obtained from a third frequency originator device in a similar manner as in the case of the other two frequency originator devices. In this case, a unique solution exists which is disposed at a measured distance (or its corresponding time of flight) from frequency originator device A, a measured distance (or its corresponding time of flight) from frequency originator device B and a measured distance (or its corresponding time of flight) from the third frequency originator device in a two dimensional space. In order to obtain a unique solution in a three-dimensional space, a fourth frequency originator device will be required. In another embodiment, the limit includes the magnetization of a magnetic material, e.g., a ferromagnet, and the strength and/or direction of the magnetic field at a point in space as indicated by a magnetometer. The frequency originator devices may also be movable provided that the positional relationships between the frequency originator devices are known.

A frequency originator device can be a mobile device and whenever possible, it is preferably connected to a wall power source such that its service is uninterrupted. A frequency receiver device is preferably a mobile device such that its use is not tethered to a fixed location. The present localization method may be extended for use with venues already having frequency originator devices, e.g., stadiums, subways, malls, parking lots, etc.

Interference may occur during transmission of data from one device to another. In order to avoid interference, a strategy that determines the most favorable frequency of a signal is used. In doing so, signals are transmitted at varying frequencies from a frequency originator device to a frequency receiver device at, e.g., regular intervals. The signal with the shortest time of flight is considered to be the signal having most suitable signal frequency as signals received at a longer time of flight may indicate the presence of echoes or other effects of interference. Upon determining the most suitable signal frequency, future communications between the frequency originator device and the frequency receiver device will then be made at this frequency to avoid interferences.

The present systems are also capable of use underwater where GPS is unavailable. When used underwater, suitable water-proofing technologies shall be used to ensure readily available mobile devices which are typically designed for use in air do not get water intrusions.

Figure 19:
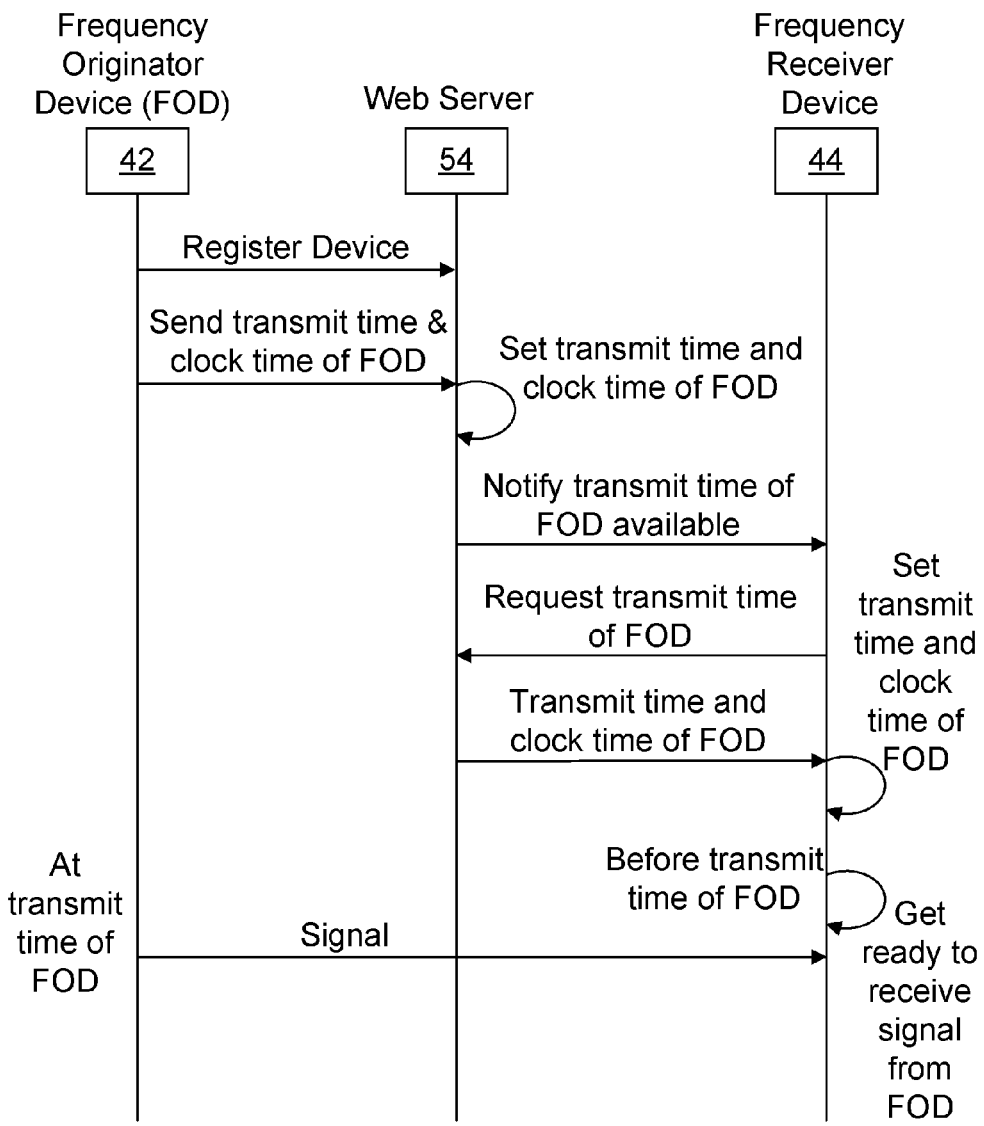
FIG. 19 is a sequence diagram depicting a means by which two devices are clock time synchronized via a web server.

FIG. 19 is a sequence diagram depicting a means by which two devices are clock time synchronized via a web server. In this example, one of the devices is a frequency originator device and the other, a frequency receiver device. Each of the frequency originator device and frequency receiver device can be a mobile device or a fixed device. The frequency originator device is first registered with a web server with some form of identification. A transmit time (the time at which a signal is to be broadcasted by the frequency originator device) is then sent to the web server where the transmit time is then associated with this frequency originator device. The web server is configured to notify the frequency receiver device that a frequency originator device is ready to make a signal broadcast. As the frequency receiver device is interested in receiving the broadcast, it responds by sending a request to the web server for the transmit time and clock time of the frequency originator device. Such information is sent to the frequency receiver device. Upon receiving such information, the transmit time and clock time are saved and used to set appropriate functions to anticipate the arrival of a signal from the frequency originator device. It shall be noted that the clock time is a time stamp in which latencies due to transmissions of this information from the frequency originator device to the frequency receiver device has been considered. The frequency receiver device is then put in a ready and standby state prior to the transmit time of the signal such that upon the arrival of the signal, the frequency receiver device is ready to receive and process the signal.

Further disclosed below are two examples of mesh network which may be formed from the presently disclosed application adapted to a mobile device, mobile device case and/or a sensor. One example involves an assigned user (customer) location by description, but not a known location on a grid relative to other users while the other involves having a specific location of the customer relative to other users as determined by the use of a location method through the devices.

Example #1

In this example, there is no specific location of the customer mobile device determined through any positioning system and there is only communication between the mobile device and a restaurant system (which utilizes SLDs to form a mesh network by Wi-Fi, etc.).

(1) Customer enters restaurant;
(2) Customer places mobile device near a Near Field Communication (NFC) pairing device, e.g., a pad on a counter with a sign. It should be noted that the NFC pairing device can be located anywhere and there can be multiples as part of a mesh network (e.g., there could be one at each table for a walk-in and "choose own table" style of restaurant). The pairing device could be an SLD handed to the customer, much like table ready pagers. In another embodiment, the pairing device does not include an NFC device, but rather devices involving other radio frequency (RF) signals such as Wi-Fi or Bluetooth. When a button is pushed, it provides a secure gateway into the restaurant system for the mobile device and stays coupled to the specific mobile device through its Media Access Control (MAC) address or a pairing process until such time later it is disconnected through options such as the next time the button is pushed or the mobile device is out of range for a given time limit;
(3) Customer mobile device is allowed into the restaurant network while in the restaurant with: (a) the notification of the availability of a table when a table becomes available and (b) the table assignment. It should be noted that the mesh network of the system allows the customers mobile device to be relayed through multiple communication nodes (e.g., SLDs in examples disclosed elsewhere herein that are placed as desired around the restaurant to assure good communication, i.e. around obstructions.);
(4) While waiting for a table assignment or at any time the customer can place their drink and food order over the mobile device;
(5) After, (3b) and (4), above, the waitress (may be a virtual person) is sent the customers information with notice to provide service;
(6) The customer proceeds to the assigned table or sits down at a chosen table and inputs his/her table number into the mobile device;
(7) The customer is prompted on the mobile device to provide a confirmation (a screen button) that they are seated;
(8) When the customer is seated, the system prompts the customer to select his/her order, e.g., desired drinks and optionally the food (if not taken by a waiter directly);
(9) A server/waiter (may be an automated system) provides the drinks and food to the customer;
(10) When the customer desires refills to his/her drink or more services, he/she pushes a button on his/her mobile device and service is dispatched;
(11) At the end of the meal when the customer is ready to leave, the customer is prompted to either (a) confirm and make payment by using a preset payment information that was confirmed at time of NFC access to the restaurant system or Wi-Fi entered data in advance or (b) initiate a secondary NFC pairing to initiate payment or Wi-Fi entered data and make payment authorization;
(12) Customer is removed from the secure restaurant system after making payment to allow the customer to provide optionally service evaluation information;
(13) Customer is automatically removed from the system if a preset duration of time expires without a signal or communication from the customer device.

Example #2

In this example, there is a specific location of the customer mobile device determined for the mobile device and the restaurant system utilizes SLD in a method to establish the customer mobile device location.

(1) Customer enters restaurant;
(2) Customer places mobile device near NFC pairing device, e.g., a pad on a counter with a sign. It should be noted that the NFC pairing device can be located anywhere and there can be multiples as part of a mesh network (e.g., there could be one at each table for a walk-in and "choose own table" style of restaurant).
(3) Customer mobile device is allowed into the restaurant network while in the restaurant with: (a) the notification of the availability of a table when a table becomes available and (b) the table assignment. It should be noted that the mesh network of the system allows the customers mobile device to be relayed through multiple communication nodes (e.g., SLDs in examples disclosed elsewhere herein that are placed as desired around the restaurant to assure good communication, i.e. around obstructions.);
(4) After, (3b) and (4), above, the waitress (may be a virtual person) is sent the customers information with notice to provide service;
(5) The customer proceeds to the assigned table or sits down at a chosen table and the SLD at the table connects to the customer mobile device to confirm location and provide secure methods for communication and payment (e.g., via NFC);
(6) An alternative step to #5 above would be that the customer is given a traveling SLD (stays with them until returned at the end of the meal) once the customer's mobile device is securely linked to the restaurant system and when they arrive at the customer's table, the SLD communicates through close Frequency Response (FR) (e.g., NFC) methods, but not limited to, another SLD at the table to give notice that the customer is now at the table and initiates a call for service;
(7) When the customer is seated the system prompts the customer to select his/her order, e.g., desired drinks and optionally the food (if not taken by a waiter directly);
(8) A server/waiter (or may be an automated system) provides the drinks and food to the customer;
(9) When the customer desires refills to their drink or more services they push a button on his/her mobile device and service is dispatched;
(10) At the end of the meal when the customer is ready to leave, the customer is prompted to either (a) confirm and make payment by using a preset payment information that was confirmed at time of NFC access to the restaurant system or Wi-Fi entered data in advance or (b) initiate a secondary NFC pairing to initiate payment or Wi-Fi entered data and make payment authorization;
(11) Customer is removed from the secure restaurant system after payment prompting to give service evaluation information;
(12) Customer is automatically removed from the system if a preset duration of time expires without a signal or communication from the customer device.

In one embodiment, the present NFC technology is practiced according to Dhwani. Reference is made to a research paper titling "Dhwani: Secure Peer-to-Peer Acoustic NFC" by Microsoft at http://research.microsoft.com/apps/pubs/default.aspx?id=192134. Dhwani is a novel, acoustics-based NFC system that uses the microphone and speakers on mobile phones, thus eliminating the need for any specialized NFC hardware. A key feature of Dhwani is the Jam-Secure technique, which uses self-jamming coupled with self-interference cancellation at the receiver, to provide an information-theoretically secure communication channel between the devices. Experiments showed that Dhwani can achieve data rates of up to 2.4 Kbps, which is sufficient for most existing NFC applications. An NFC technology enables physically proximate devices to communicate over very short ranges in a peer-to-peer manner, without incurring the overhead of any complex network configuration effort. However, the adoption of NFC-enabled applications has been stymied by the low levels of penetration of NFC hardware.

The communication with the MPSD can be though direct wired coupling to the MCD or though remote communication using wireless communication such as, but not limited to, Near Field, Bluetooth, and Wi-Fi communication. This remote communication can be wholly wireless or involve one or more wired connections and internet communication, in a plurality of combinations thereof to allow for great distance to separate one or more paired MCDs and one or more MPSDs and one or more SLDs. SLD can have the meaning of a device electrically coupled or wirelessly coupled or paired to the MPSD or directly to any number of MCDs. The MPSD device can be electrically connected directly to the MCD while functioning as a MCD case, but can also be wholly or partially decoupled and retain communication with the MCD and aggregate devices through wireless and internet communication methods. However, pairing of SLDs directly to the MCD is also possible utilizing application software on the MCD and the MCD functioning as the MSPD. The present security system would also allow for more than one MCD pairing, including a plurality of MCDs. MPSDs, SLDs, other computing and communication devices such as personal computers and servers can be paired to comprise one or more mesh networks or linked mesh network of devices. For example, the pairing of two mobile phones to one or more MPSD and/or SLDs could enable each paired mobile phone or device, when given an alarm code from the MPSD or LMD, to initiate separate and different automated commands. For example, one mobile phone could send an automated text to a friend while the other could make an automated call to an emergency number (such as 911) with a preprogrammed message having the name of the person and asking the police to locate the person by the GPS coordinates, network triangulation method, or other forms of geographic locating that may be used to extrapolate a location. Also embodied in this invention is an MCD using an wired or wireless connection to the internet making use of a soft phone (not needing a wireless phone service) to call for help or dispatch the police. Such a call, whether over a wireless network, mobile phone, or other method could be made without visible notification appearing on the MCD to prevent any assailant from knowing it was taking place. This would be especially beneficial if an assailant forced entry into a person's hotel room before the person could attempt to call an emergency number. The MPSD would be alerted during the initial stage of the forced entry through sensor readings of, but not limited to, motion, sound, etc., and would immediately call the emergency number covertly and in silence without the assailant knowing, giving vital time for the authorities to be notified and to respond without alerting the assailant of their dispatch.

One method of monitoring used by the MPSD is data provided from a linked network such as, but not limited to, a network providing information such as connected device usage that could indicate the presence of an unauthorized person while the owner is away. For example, the network may provide information over the internet that a device has been used during a period where the premise should have been unoccupied. Also the MPSD could connect to the network, but not limited to, network while still outside the premise and determine if there had been or still is an intruder based on information such as, but not limited to, electronics use by opening a refrigerator or turning on lights.

One monitoring method used in the security device is a motion sensor such as, but not limited to, an accelerometer, that when in use with a lanyard or a plurality of other attachment methods could be hung from a hotel door knob and communicate wirelessly to a MCD. The MPSD could detach from the phone as a removable MCD case and/or attachment and hung from the door. One or more SLDs could be removed from the MPSD and paired with the MPSD. The flexibility to position SLDs in a plurality of locations affords the best positioning for security monitoring purposes.

Another monitoring method used in the MPSD is a sound sensor to detect specific sounds such as the breaking of glass. However, this sound sensor could also be used as a listening device located remotely from the MCD, but communicating with the MCD through both wireless and internet communications. The sound sensor could utilize, but not limited to, voice recognition to sound an alarm or initiate actions based on the sound of a specific voice, the tone of voices, or the use of key words that are linked to preprogrammed or derived actions by artificial intelligence.

Another monitoring method used by the MPSD is one or more cameras for use in detecting, but not limited to, motion, as other parameters such as inferred light and light surges may be monitored. The mobile security device may have one camera that when paired with the phone can perform stereo or 3D video and photo function allowing for monitoring of change in distances (such as if pointed toward a door and the door opened). The mobile security device optionally may include more than one camera allowing for the device to remotely monitor, but not limited to, changes in distances when separated from the phone, thereby not requiring the use of the phone's camera to perform the monitoring function. The one or more cameras may also optionally be used to provide the remote transmission of live video or individual digital photos to the phone or directly to a communications hub and over the internet.

Another monitoring method used by a MPSD is GPS location monitoring and transmission of position to third parties through wireless or internet communication means. The GPS location information can be obtained through the GPS function of the MCD and when the MPSD is activated, the MCD is used to contact third parties and provide the GPS location of the phone.

Another monitoring method used by the MPSD is network tower location monitoring and transmission of position to third parties through wireless or internet communication means. The network tower location information can be obtained through tower location information provided by the wireless provider of the MCD and when the security device is activated, the MCD is used to contact third parties and provide the nearest network tower location to the MCD.

Another monitoring method used by the MPSD is network tower location triangulation by measurement of time of flight between network towers near the MCD and transmission of position to third parties through wireless or internet communication means. The network tower location information can be obtained through tower location information provided by the wireless provider of the MCD and when the security device is activated, the MCD is used to contact third parties and provide the estimated location of the MCD based on time of flight of signals to surrounding towers.

Another monitoring method used by the MPSD is local network locating such as an identified link to a Wi-Fi network and transmission of position to third parties through wireless or internet communication means. When the security device is activated, the MCD is used to contact third parties and provide pertinent information to identify the physical location of the local network to which the MCD has been either connected or identified if no connection was made.

Another function of the MPSD is to allow for emergency band transmission. This emergency band transmitter could be incorporated into the device or activate a transmitter paired with the device.

Pairing of the MCD to MPSDs and SLDs may be performed optionally with NFC communication when set to pair and moved into NFC communication range.

Pairing of the MCD to MPSDs and SLDs may be performed optionally with a combination of motions (e.g., two quick bumps between devices) and near proximity allowing NFC communication to confirm the simultaneous motion of the two devices to allow secure pairing.

Pairing of the MCD to MPSDs and SLDs may be performed optionally with Wi-Fi or other wireless or wired communication when set to pair and identifying the device to be paired as present on the Wi-Fi, wired, or other communication network or more simply with a combination of motions (e.g., two quick bumps between devices) occurring simultaneously by the two devices being bumped together.

Pairing of the MCD to MPSDs and SLDs may be performed optionally with Wi-Fi or other wireless or wired communication when set to pair and identifying the device to be paired as present on the Wi-Fi, wired, or other communication network with a combination of simultaneous motions (e.g., two quick bumps between devices to be paired) occurring simultaneously, or within a time interval acceptable to be viewed as simultaneous, allowing for network lag.

Pairing of the MCD to MPSDs and SLDs may be performed optionally with a combination of various communication methods allowing identification of the devices to be paired over a plurality of wireless and internet connections and optionally may include the use of a secure identifier such as a system generated number utilizing an algorithm unique to the authorized party or parties and their devices.

Multiple MPSDs and SLDs may also be paired into subgroups within a network or mesh network. This allows for multiple sensor capturing and analysis. For example the detection of vibration could be analyzed with data from one subgroup of sensors and compared to another subgroup of sensors to determine what type of vibration is taking place. A personal security device might more accurately then determine if an earthquake is taking place as compared to a more local shaking of a building from passing truck traffic.

Multiple MPSDs and SLDs may be paired into macro groups based on proximity or other parameter such as social category and for the purpose of sharing data and communicating with others included in the macro group. Connectivity would be more limited with macro group devices than for in-group fully paired devices to assure security. The macro group, for example, could be initiated simply by walking into a store and within proximity to other MCDs or on the same wireless network. An example of a security application would be a missing child in the store and the parent's immediate ability to send and instant message or text to all connected persons in the macro group with a picture of the missing child and a current description of the clothes being worn. Such real time communication could also warn of a dangerous or unknown person in the neighborhood and alert all the neighbors who are a part of the relevant macro group.

The MPSDs and SLDs may be paired with existing security devices that may be stationary at a hotel or in a home. This ability to pair with devices already installed allows for an expansion of the MPSD and SLD security coverage. Further this functionality allows for ease of the use by having a known security user interface that travels with the user and for which they have their personalized security settings.

The MPSDs may be powered with various methods such as, but not limited to, disposable batteries, rechargeable batteries, wired connection to a power source, and solar cells.

Another monitoring method of the MPSD is to allow the MPSD or separately SLD to operate autonomously without a direct communications link to the MCD or MDCs. For example, one or more MPSDs by themselves in combination with SLDs or SLDs by themselves could be left in a location to record monitored data and prepare information or warnings as soon as communication with the paired MCD/s or MPSD/s is restored. This can be done due to a loss of communication or purposefully where monitoring and advance warning is desired, but no method of communication exists (e.g., internet or wireless) to relay information to the MCD without the MCD being preset. An example would be the set-up of the MPSD/s and/or SLDs to monitor the inside of building, room, or vehicle and give warning to the holder of the MCD or MPSD before entering that a security risk has been detected. This would be accomplished by the MPSD/s and/or SLDs linking to the MCD upon entering communication range and transmitting data for a warning and potentially taking other preprogrammed actions such as calling the police. Another example of this functionality would be the MCD or MPSD being able to link to one or more cameras prepositioned inside a premise and able to be used for real time or playback functions allowing a person to remotely view the premise prior to entering. The MPSD and SLDs can function in a sleep mode or make use of lower energy Bluetooth to conserve energy and extend battery life.

Another method of monitoring use by the MPSD is to pair with systems in a car either wireless or wired and to utilize that data for personal security and safety. For example, the MPSD can receive information from the car crash sensors or airbag deployment and immediately send an emergency call for help to third parties providing such data as GPS or other derived location information and other pertinent information for emergency response including any real time health condition information that may be provided by the MPSD such as pulse, breathing, depending on optional monitoring functions included in the MPSD. Another example could be the MPSD or LSD receiving data from the car's rear facing camera while being tailgated and storing that information on-board to a remote location for use later if the event a rear-end accident or other type of accident occurred.

Another method of monitoring used by the MPSD is to have an in-transit (or in-car) mode that is activated manually or automatically by detection of the car system allowing for additional monitoring and preprogrammed actions such as the use of an accelerometer to detect a crash event and immediately send an emergency call for help to third parties providing such data as GPS or other derived location information and other pertinent information for emergency response including any real time health condition information that may be provided by the MPSD such as pulse, breathing, depending on optional monitoring functions included.

Another method of monitoring is the use of paired MPSDs or SLDs to monitor the movement of each relative to the others. For example, a parent in a store could know where their children are located based on the locations of their MCDs or integrated MPSD and MCD or the position of SLDs that are attached or in the possession of the child.

Another method of monitoring is combining the MPSD and Closed Circuit Televisions (CCTV) cameras to provide round-the-clock security. This could allow an individual to be under protective surveillance. The MPSD can be paired with the CCTV and the individual can, for example, do a specific gesture that indicates the need for help.

Another method of monitoring is using the MPSD with more than one integrated communication device that allows alternative communication in case a communication frequency is blocked. For example the pairing with the CCTV could be blocked for Wi-Fi but the Bluetooth could still reach the CCTV network and use an audio message from the individual.

Another method of monitoring is to examine the Electromagnetic Interference (EMI) that most consumer electronic appliances produce as identifying signatures.

The MPSDs and SLDs may have a panic feature that allows for taking multiple automated actions to contact help based on preprogrammed functions. The panic feature may be embodied in the form of a physical button that when held down for a longer duration initiates the panic actions. However, the panic function may be initiated with any number of methods including any of the actions such as a specified number of shakes, a code word said while pushing a button, or a failure to provide the correct response to an automated query. The panic response may include, but not limited to, the use of the MCD making loud noises, the noise of a paired device with a speaker serving as a siren, the initiation of a plurality of sounds lights such as those pared to the device or receptive to panic commands. A further embodiment of the panic functionality is to optionally have the panic feature send an immediate panic "electronic scream" instant message, text or other form of urgent notice to phones immediately in the area or connected to the same local network (e.g., a Wi-Fi). However the "electronic scream" may also be transmitted by wireless communication and internet communication to remote third parties. Another example may be the use of a MPSD or SLD panic function when paired with a car to set-off the car alarm siren and flashing lights. An SLD, for example, could be in the form of a key fob and similar in appearance to the car's key fob, but having the ability to initiate many more panic functions through the preprogrammed parameters in the MPSD system.

The MPSDs and SLDs may have a "go dark" command where a command is sent remove the risk of exposure of being found. Such "go dark" command may be, but not limited to, disconnecting from all communication network, unpairing with any local or distant devices, and turning off any GPS or other location capable technology. In this manner, the user/s of such devices can avoid any monitoring that may be intended to determine their location.

The MPSDs and SLDs may also have a switch to allow for information sharing to be at more than one preset level such as a company or work setting and a separate personal setting. The switch may be in the form of a soft switch or a physical switch. This allows for preset parameters in the MCD to only show one set of information such as for work and limit to not show information or provide data that is more personal in nature.

The MPSDs and SLDs can also have a "wipe clean" command that allows the device to be reset and delete any remaining data as well as initiate similar actions in any paired devices including the MCD.

The MPSDs and SLDs may have an emergency professional function that when an accident or recognized dangerous health event (such as a heart attack) occurs, the MPSDs or SLDs or both can utilize audio, visual, and wireless communication to notify the emergency professional of important medial information such as emergency contacts, allergies, etc. For example, the MPSD may send a text of information to any nearby emergency professional. The MPSDs or SLDs may give and repeat the information by playing a pre-recorded statement or text to voice data loudly and repeatedly to assure notice. The MPSD and SLDs may also utilize the MCD screen to flash hazard lights (e.g., red and white off and on) or display the information that has been pre-selected by the owner of the device.

The MPSDs and SLDs may be utilized to monitor heath status of persons as well. For example, an SLD could be a heart rate or pulse monitor coupled wirelessly to the MPSD and able to sound an alarm if the heart rate drops and to additionally contact third parties for assistance through a plurality of communication methods.

The MPSDs and SLDs may link to external databases and use processing power from external systems to provide high level device security to prevent unauthorized tampering. For example, the MPSDs and SLDs may utilize technology such as facial recognition where the software to run the actual analysis and the data for the facial recognition may best reside on a remote computer or server allowing the MPSDs or SLDs to minimize processing hardware such as processors and memory, keeping the cost low. Data may optionally be stored at a remote location and be transmitted real time, but may also be sending in data packs to best utilize communication power. The transmission of data packs also allows for the storage of information until such time as a network communication for the task is available preventing loss of data and efficient use of network resources.

The MPSDs and SLDs may send data for storage on a remote computer or server through wired or wireless connection to the internet, allowing the MPSDs and SLDs to have relatively low levels of on-board memory, keeping costs down. The data can be sent real time or at time intervals or copied to one or more other storage devices simultaneously.

The MPSDs and SLDs may function as secure keyboards coupled with encryption technology such as Bluetooth encryption controlling hotel devices. In this manner, keyboards that may be hacked, such as at a hotel, can be avoided. These keyboards could be used, in combination with MPSDs, with one or many communication devices to activate preprogrammed or new functionality via the keyboards. For example, a door or sensor could be enabled or disabled using the keyboard by a wife while a husband is using the phone paired with the door or sensor in a different location. This door or sensor will activate a security pre-alarm system in the web site and the wife will have a specific period of time to disable the alarm (also a key word could be used to present a dual possibility a real disable alarm and a fake disable alarm to protect the users).

The MPSDs and SLDs can be used as Bluetooth remotes, providing for secure and encrypted controlling of devices that may be hacked in locations such as hotels and other places where electronics may have a higher risk of having been hacked. However, the reach of the remotes can be extended by utilizing, for example, an SLD to send the Bluetooth command, while having the SLD receive its command from the MPSD or MCD linked through a larger area network such as the wireless telephone network or in combination with the wireless phone communication network, Wi-Fi, and internet connections.

The MPSDs and/or SLDs can be programmed with sleep mode and automatic shutoff functionality to optionally allow for time periods to not be monitored, periods of heightened monitoring, and combinations thereof.

The MPSDs and SLDs may be secured using facial recognition only or a combination of facial recognition with facial movement or other actions, including but not limited to, involving button combination pushes, screen or phone tap combinations detected by an accelerometer on-board to the MPSD or MCD.

The MPSDs and SLDs may be secured using voice recognition only or in combination with other device securing methods.

The MPSDs and SLDs may be secured using verbally spoken code words. In order to gain access to a secured MPSD or SLD, a background sound may be required (e.g., a song) and if the background sound is deemed incorrect, a silent alarm/help notification is initiated.

The MPSDs and SLDs may be secured using finger print technology only or in combination with other device security methods.

The MPSDs and SLDs may be secured using eye or iris recognition technology.

The MPSDs and SLDs may be secured by using eye tracking technology.

The MPSDs and SLDs may be secured by using photographic comparison, e.g., a face recognition for activation could also require a specific background to be valid and, if the background is incorrect, a silent alarm/help notification is initiated.

The MPSDs and SLDs may be secured using signature recognition technology.

The MPSDs and SLDs may be secured using visual motion detection such as movements or gestures recognized through an on-board or linked camera.

The MPSDs and SLDs may be secured using motion sensing technologies, e.g., motions that can be detected and interpreted. For example, the movement of the device in a FIG. 8 pattern and detected by on on-board or linked accelerometer or other motion capturing method. Another example would be a code tapped onto the MPSDs or SLDs that would serve as a security code.

The present MPSDs and SLDs can include the functionality to do repeat automated security checks at specified times (or as an automated response to a security event). These security checks could be activated by the MPSDs or SLDs or from an external system that is securely linked to the MPSDs or SLDs. For example, the security check could be comprised of a phone call or instant message requiring the correct verbal or written answer which if not received would result in the monitoring system to contact third parties to request assistance. This would be especially useful in situations where privacy is desired, but having security monitoring is beneficial such as a first date situation or a person has a higher risk to encounter a dangerous situation. Any one of the aforementioned methods to secure the MPSDs or SLDs, is an embodiment of communication and confirmation techniques used to perform the repeat automated security checks and requires an action that when done correctly, gives an all-clear direction until the next scheduled automated security check. When done incorrectly, the MPSDs or SLDs will covertly or if desired, overtly notify third parties of the need for assistance to be provide to the person or persons being monitored.

Another method of monitoring used by the MPSD is Radar band motion and distance sensing. Radar signals emitted from the device or an external paired or unpaired device can be monitored to determine if there is motion or utilized to avoid obstacles on a moving MPSD or SLD.

Another method of monitoring used by the MPSD is temperature sensing. This temperature sensing can be utilized to determine if there is a danger of fire and contact third parties for help (such as by placing an automated 911 call). Temperature sensing could also be used to monitor health conditions of the persons to whom the sensor/s are attached. For example, the presence of a high fever could be caught immediately and a notice given to the person with the fever, but also to contact third party health professionals to provide assistance. This would be especially true for monitoring the temperature of a baby while the baby is sick and providing information to the parent.

Another method of monitoring involves heart rate monitoring. A heart rate monitor can be used to determine if a person is in duress and trigger an automated security check, which if not answered, can result in an automated request for assistance from third party emergency professionals or the police.

Another method of monitoring is blood insulin monitor receiving input through various methods and providing communication as outlined above and also through a plurality of methods including, but not limited to, and glucose meter module or integrated subassembly of the device.

Another functionality of the device would be to allow for wireless locking and unlocking of a door with the plurality of local and distant communications links outlined above. For example, a person could be remote in another city, connected to the internet, and send a signal through a network to the device while the device is hanging from the door knob by a lanyard at a hotel and allow the hotel room door to unlock, giving permission to persons while not having to be present. Additionally this functionality could be used to allow one mobile phone to relay necessary door access codes/data to another phone (that is paired earlier as a second phone with the device) and allow that second phone to lock or unlock the door. In this way, a person arriving at a later time could already have the hotel room door access information and be able to enter the room without the original person being present with their phone. The second person would not need to present at the hotel desk to request access to the room and have the possible issues related to not being the registered person for the room.

In yet another usage example, an exosuit/bodysuit can be used for the house to detect the user's location and temperature or health condition. This allows temperature sensors in the house to signal a security alarm in case an unregistered heat signature movement is presented close to the user. This sensor located in the bodysuit/exosuit can provide an early alarm system.

Bracelets with embedded MPSD configured for fingers movement detection can be used to control a mobile device and communicate for a voice impaired persons. The bracelets can be used as a virtual keyboard or/and extension to communicate to a mobile device or any other device with the MPSD interface.

Several MPSDs (having audio, video, GPS functions, etc.) can provide an extensive database about an individual that can use a plurality of data mining practices to create personal assistants, anticipating what the user needs before he or she may ask for it. For example, reminding a user to buy bread next time he or she stops for groceries. This could be an enhanced combination of services to provide a quick and easy answer to anything that the user needs, e.g., a movie that he or she likes. An MPSD combined with the personal assistance features could communicate with the movie network and make the arrangements via a social networking site without the user needing to look for the tickets or contact his or her friends.

In one embodiment, any one of the present sensors, mobile device cases and applications adapted to a mobile device may be configured to operate according to the use of ambient backscatter. Reference is made to the scientific paper "Ambient Backscatter: Wireless Communication Out of Thin Air" by Vincent Liu, Aaron Parks, Vamsi Talla, Shyamnath Gollakota, David Wetherall, Joshua R. Smith, all of the University of Washington and may be contacted via {liuv, anparks, vamsit, gshyam, djw, jrsjrs}@uw.edu. In another embodiment, a mobile device case is configured to receive power from a mobile device to which it is attached and a sensor receives power from an on-board power supply.

While the methods, systems and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

What is claimed herein is:

1. A method for determining the location of a frequency receiver device with respect to at least two frequency originator devices, each of a known location, said method comprising:
   (a) synchronizing a clock of said frequency receiver device with a clock of one of said at least two frequency originator devices;
   (b) receiving by said frequency receiver device, a message containing a broadcast time at which said message is broadcasted from said one of said at least two frequency originator devices;
   (c) calculating a time of flight of said message by calculating the difference between a receive time at which said message is received by said frequency receiver device and said broadcast time;
   (d) repeating steps (a)-(c) for another one of said at least two frequency receiver devices to result in a first time of flight and a second time of flight;
   (e) calculating a ratio of said first time of flight and said second time of flight;
   (f) resolving possible locations of said frequency receiver device by looking up a table containing possible locations of said frequency receiver device with respect to the locations of said at least two frequency originator devices; and
   (g) applying at least one limit to said possible locations to select one of said possible locations with high certainty.

2. The method of claim 1, wherein at least one of said frequency receiver device and said at least two frequency originator devices is a mobile device.

3. The method of claim 1, wherein said frequency receiver device and said at least two frequency originator devices are capable of underwater operation.

4. The method of claim 1, wherein each of the known locations is movable.

* * * * *